Oct. 21, 1969  J. LEBLOND  3,473,422
TIRE TESTING MACHINE AND METHOD
Filed June 9, 1967  10 Sheets-Sheet 1

INVENTOR.
JEAN LEBLOND
BY Jack Rosin
ATTORNEY

Oct. 21, 1969   J. LEBLOND   3,473,422
TIRE TESTING MACHINE AND METHOD
Filed June 9, 1967   10 Sheets-Sheet 3

INVENTOR.
JEAN LEBLOND
BY Jack Rosin
ATTORNEY

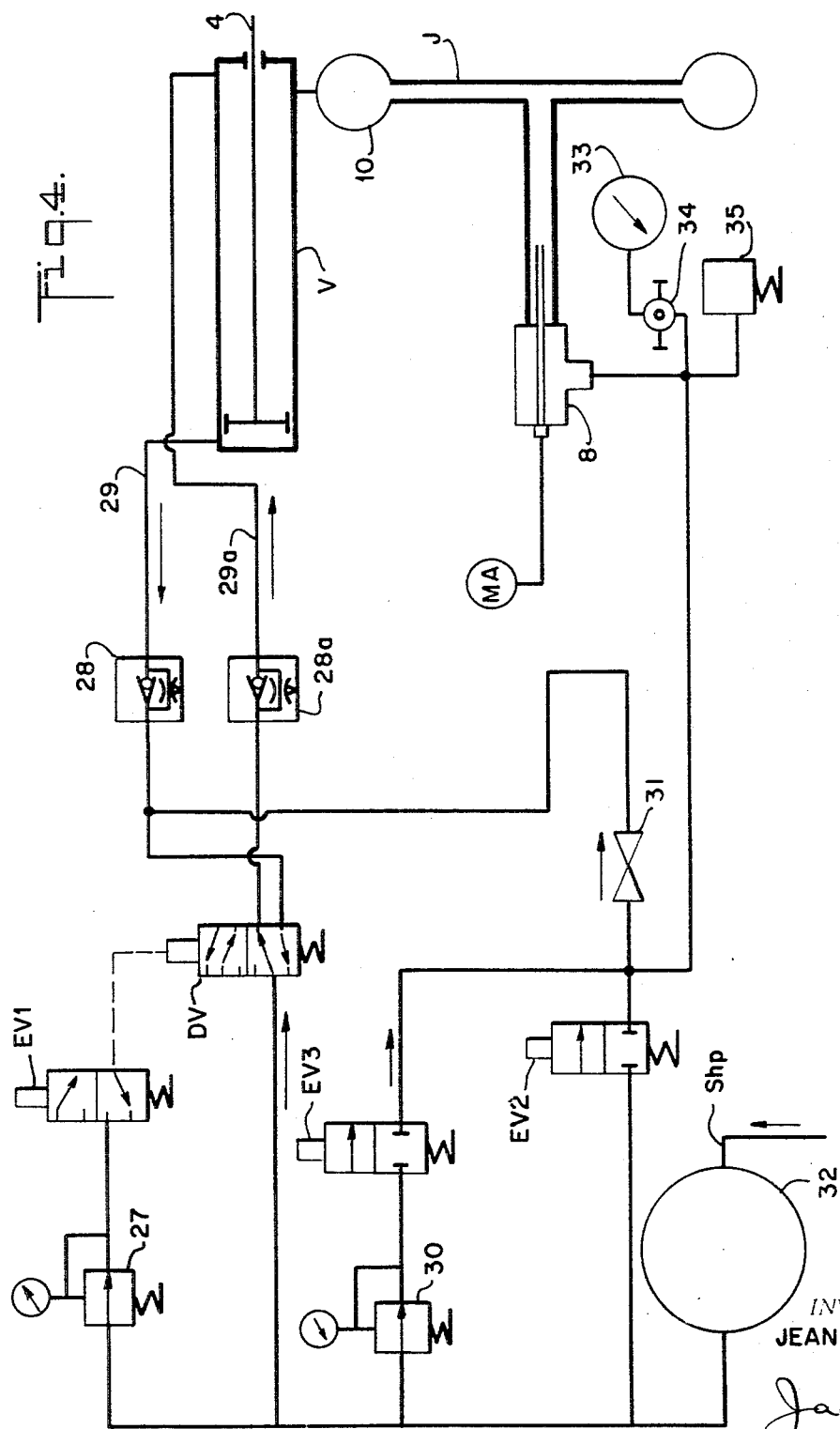

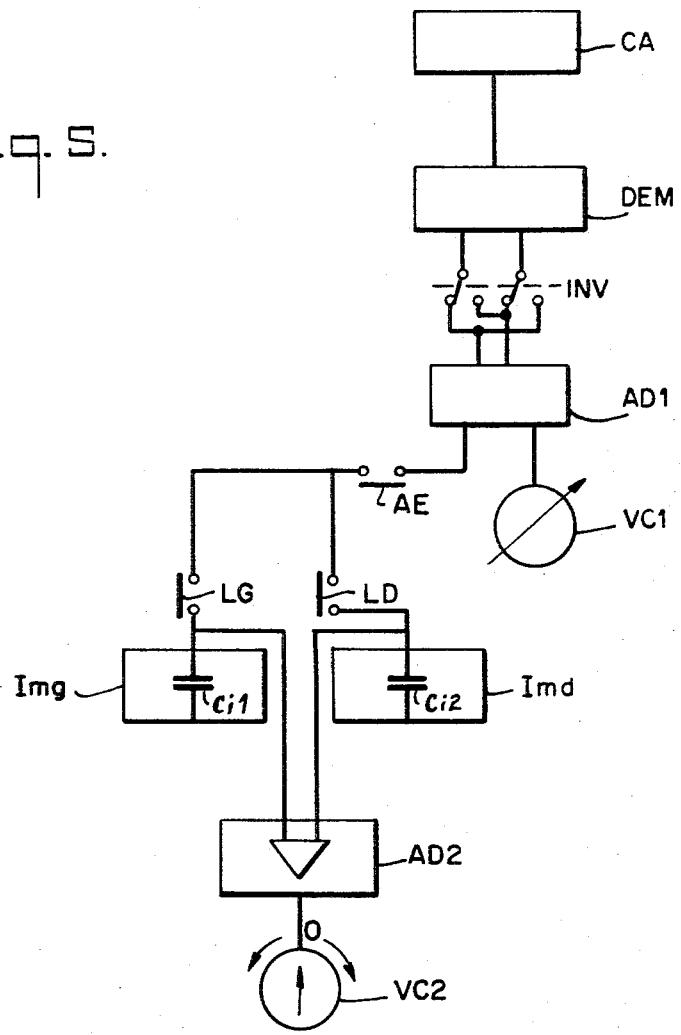

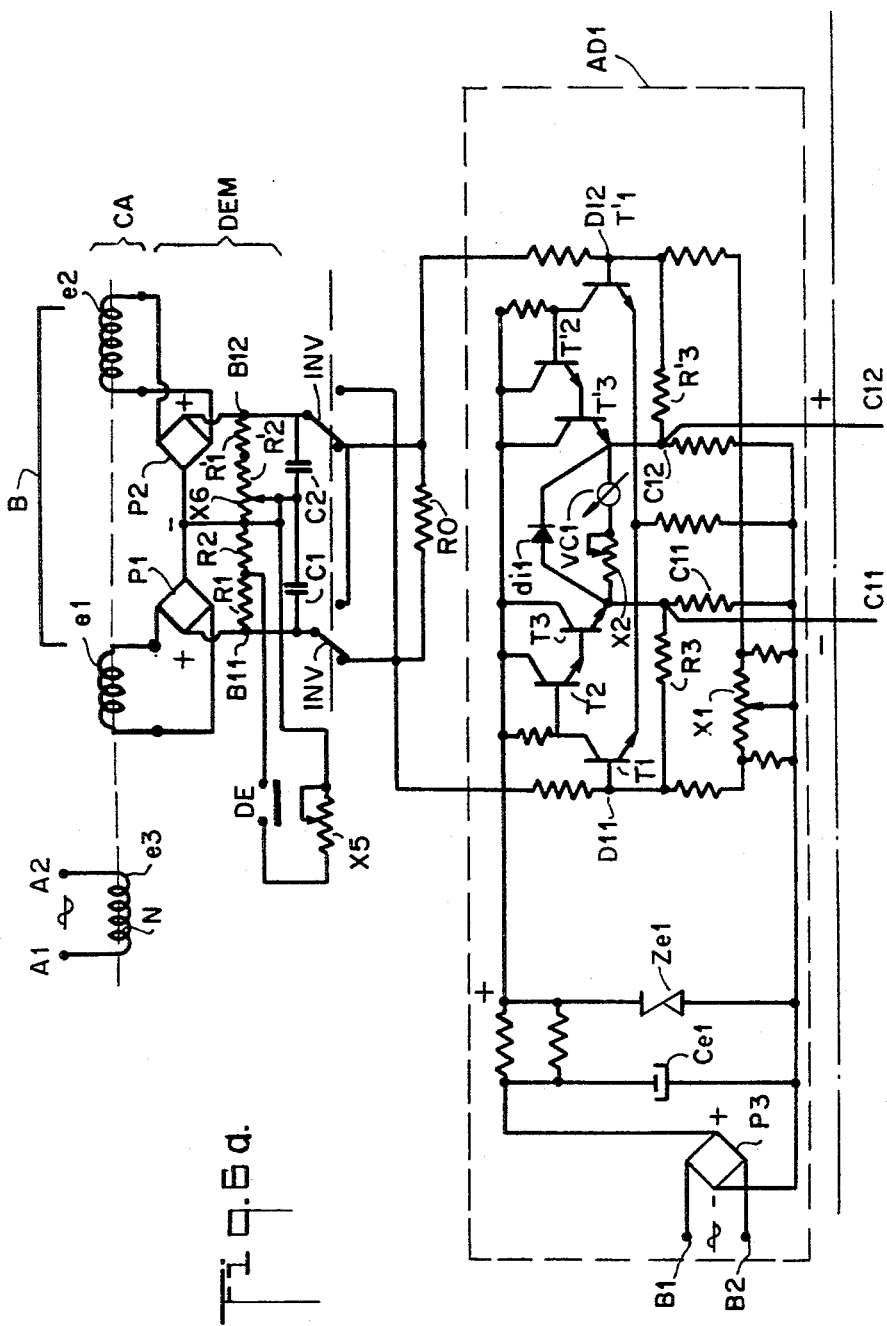

Oct. 21, 1969  J. LEBLOND  3,473,422

TIRE TESTING MACHINE AND METHOD

Filed June 9, 1967  10 Sheets-Sheet 6

INVENTOR
JEAN LEBLOND

BY Jack Rosin
ATTORNEY

INVENTOR.
JEAN LEBLOND

United States Patent Office
3,473,422
Patented Oct. 21, 1969

1

3,473,422
TIRE TESTING MACHINE AND METHOD
Jean Leblond, Compiegne, France, assignor to Uniroyal Englebert France S.A., Paris, France, a corporation of France
Filed June 9, 1967, Ser. No. 644,877
Claims priority, application France, June 24, 1966, 66,924
Int. Cl. B60c *19/10;* G01m *17/02*
U.S. Cl. 73—146                              19 Claims

ABSTRACT OF THE DISCLOSURE

A tire testing machine in which a tire is pressed against and rolled on an axially deflectable roller and the axial deflection of the roller during rotation of the tire is sensed by a differential transformer which provides an output voltage corresponding to the axial movement of the roller. The output voltage is fed to electrical integrating and display circuits during rotation of the tire, which circuits compute and display various of the lateral forces developed during rotation of the tire.

BACKGROUND OF THE INVENTION

The present invention relates to a method of and machine for measuring laterally directed parasitic forces in a rolling tire.

It is well known that a tire rolling on a surface causes a lateral reaction to occur on the contacted surface. This reaction is particularly significant in radial ply tires having circumferential breakers or belts therein and it is due to the generation of parasitic forces which result both from the external and from the internal configuration and structure of the tire.

When asymmetric configurations or internal irregularities or defects are present in a radial ply tire, the parasitic forces generated during rolling of the tire are often of sufficient intensity to cause disturbances to be felt in a moving vehicle having such tires. These disturbances are pronounced manifestations of one or the other or both of two effects which are referred to herein as "conicity" and "sinuousness."

The conicity effect occurs when the parastic forces developed in a rotating tire tend to continually alter the path of movement of the tire either to the left or to the right of a desired path of movement, regardless of the direction of rotation of the tire, in much the same manner as in the case of a cone rolling on its side on the ground. The parasitic forces which cause the conicity effect to occur are hereinafter designated by the term "conicity forces" and by the symbol "Fc". The sinuousness effect occurs when the parasitic forces developed in the rotating tire tend to continually alternate the path of movement of the tire from one side to the other side of a desired path, in each direction of rotation of the tire, the path actually followed being similar to the path a snake would make in moving over the ground. The parasitic forces which cause the sinuousness effect to occur are hereinafter designated by the term "sinuousness forces" and by the symbol "Fs."

It should also be noted that, in addition to the conicity force Fc and the sinuousness force Fs, a rolling radial ply tire generates a lateral force which stems from the interaction of the wires or cords in the outer breaker ply of the tie with the ground. This force, hereinafter designated by the term "breaker force" and by the symbol "Fb," is directed axially of the tire in one direction during rotation of the tire in a first or forward direction, and is directed axially of the tire in the other direction during rotation of the tire in a second or reverse direction.

2

When a vehicle is provided with one or more tires having a pronounced conicity effect, there is a tendency for the vehicle to pull away from the desired driving path, causing the driver of the vehicle to have to make constant steering corrections and also causing excessive tire wear. Similarly, when the sinuousness effect is pronounced in one or more tires of a vehicle, the vehicle will tend to follow a serpentine path, causing unpleasant movement and vibrations in the vehicle, particularly at high speeds, as well as causing excessive tire wear. Accordingly, it becomes important to grade tires with respect to the values of conicity forces and sinuousness forces produced by them.

The present invention has as its main objective the provision of an improved method of and apparatus for measuring the magnitude of the parasitic forces generated by a rolling tire.

A further object of this invention is to provide an improved method of and apparatus for measuring the magnitude of the conicity forces generated by rolling tires in order to facilitate grading of the tires in accordance with such measurements.

Another object of this invention is to provide an improved method of and apparatus for measuring the magnitude of sinuousness forces generated by rolling tires in order to facilitate grading of the tires in accordance with such measurements.

Further objects and advantages of this invention will become apparent as the following description proceeds.

SUMMARY OF THE INVENTION

Briefly stated, and in accordance with one embodiment of this invention, a preferred method of measuring the magnitude of parasitic forces generated by rolling tires comprises (1) rolling an inflated tire under predetermined load along a surface that is movable in a direction substantially parallel to the axis of the tire in response to the urging of the parasitic forces generated by the rolling of the tire along the surface, (2) sensing and developing voltages corresponding to the amount and character of such movement during at least one revolution of the tire in one direction and during at least one revolution of the tire in another direction, and (3) converting such voltages into measurements of said parasitic forces.

A prefererd apparatus in accordance with this invention comprises a frame, a cylindrical roller, means for rotatably supporting the roller on the frame in a manner allowing substantially axial movement of the roller, sensing means coupled to the supporting means for initiating voltages corresponding to the axial movement of the roller, means for supporting a tire rotatably with its axis substantially parallel to the axis of the roller, means for relatively moving the tire supporting means to bring the tire into contact with the roller for loading the tire, drive means for rotating the tire and roller in rolling contact, and means to convert the voltages initiated by the sensing means into measurements of parasitic forces.

BRIEF DESCRIPTION OF THE DRAWING

While the specification concludes with claims particularly pointing out and distinctly claiming the subject matter regarded as the invention herein, it is believed that the invention will be better understood from the following description taken in conjunction with the accompanying drawings, in which:

FIG. 4 is a synoptic diagram of the pneumatic circuits employed in the operation of the apparatus shown in FIGS. 2 and 3;

FIG. 5 is a synoptic diagram of electrical circuits employed in measuring and indicating conicity forces and sinuousness forces in accordance with one embodiment of this invention;

FIGS. 6a and 6b, together, constitute a schematic electrical diagram showing the electrical circuits of FIG. 5 in greater detail;

DESCRIPTION OF THE PREFERRED EMBODIMENT

Figure 1:
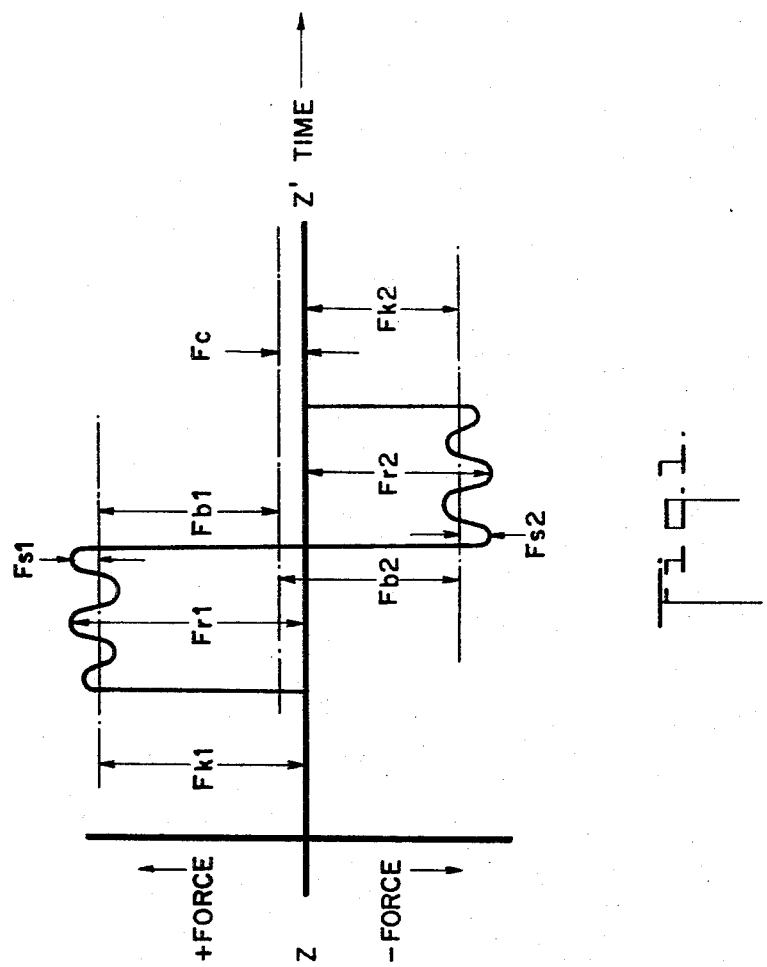
FIG. 1 is a schematic diagram showing the parasitic forces measured by the method and apparatus of this invention.

Referring to FIG. 1, there has been illustrated a force-time diagram on which there has been represented one example of the various transverse forces which are generated during rotation of an inflated, loaded, radial ply tire in first and second directions against a roller or drum. During rotation of the tire in the first direction, the roller undergoes a resultant force $Fr1$ which is variable and is directed in a first direction. This force may be instantaneously resolved into a relatively variable sinuousness force $Fs1$ and a relatively constant force $Fk1$ on which sinuousness force $Fs1$ is superimposed, such that:

$$Fr1 = Fk1 + Fs1$$

During rotation of the tire in the second direction, the same roller undergoes a variable resultant force $Fr2$ which is generally directed in the opposite direction to $Fr1$. This force may also be instantaneously resolved into a relatively variable sinuousness force $Fs2$ and a relatively constant force $Fk2$ on which sinuousness force $Fs2$ is superimposed, such that:

$$Fr2 = Fk2 + Fs2$$

In accordance with the method of the present invention, the mean value of the conicity force $Fc$ is obtained by subtracting the mean value (constant force $Fk2$) of the resultant force $Fr2$ from the mean value (constant force $Fk1$) of the resultant force $Fr2$, while the maximum value of the sinuousness force is obtained by measuring the maximum amplitude of the sinuousness forces $Fs1$ and $Fs2$. The mean values $Fk1$ and $Fk2$ of forces $Fr1$ and $Fr2$, respectively, are obtained by integrating the voltages representing forces $Fr1$ and $Fr2$ during equal periods to determine the areas enclosed between the reference line Z–Z' and the curves representative of forces $Fr1$ and $Fr2$, respectively, in FIG. 1. The integration may be performed for one or more revolutions in each direction so long as the number of revolutions made in each direction is the same. Thereafter, the voltages representive of the integrals of forces $Fr1$ and $Fr2$ are algebraically combined and their algebraic sum is applied to a calibrated indicating device or voltmeter to provide a reading of the value and direction of the conicity force $Fc$. The difference between the two constant forces $Fk1$ and $Fk2$ is actually equal to twice the conicity force $Fc$, as may be determined from an inspection of FIG. 1, because the conicity force $Fc$ of each revolution of the tire is additive, regardless of the direction of rotation of the tire. The resulting accumulative value of conicity forces $Fc$ is preferably proportionally reduced to the value of the conicity force $Fc$ for a single revolution by suitably adjusting the calibration of the indicating device. The breaker forces involved in the example illustrated in Example 1 are designated by the symbols $Fb1$ and $Fb2$.

Figure 2:
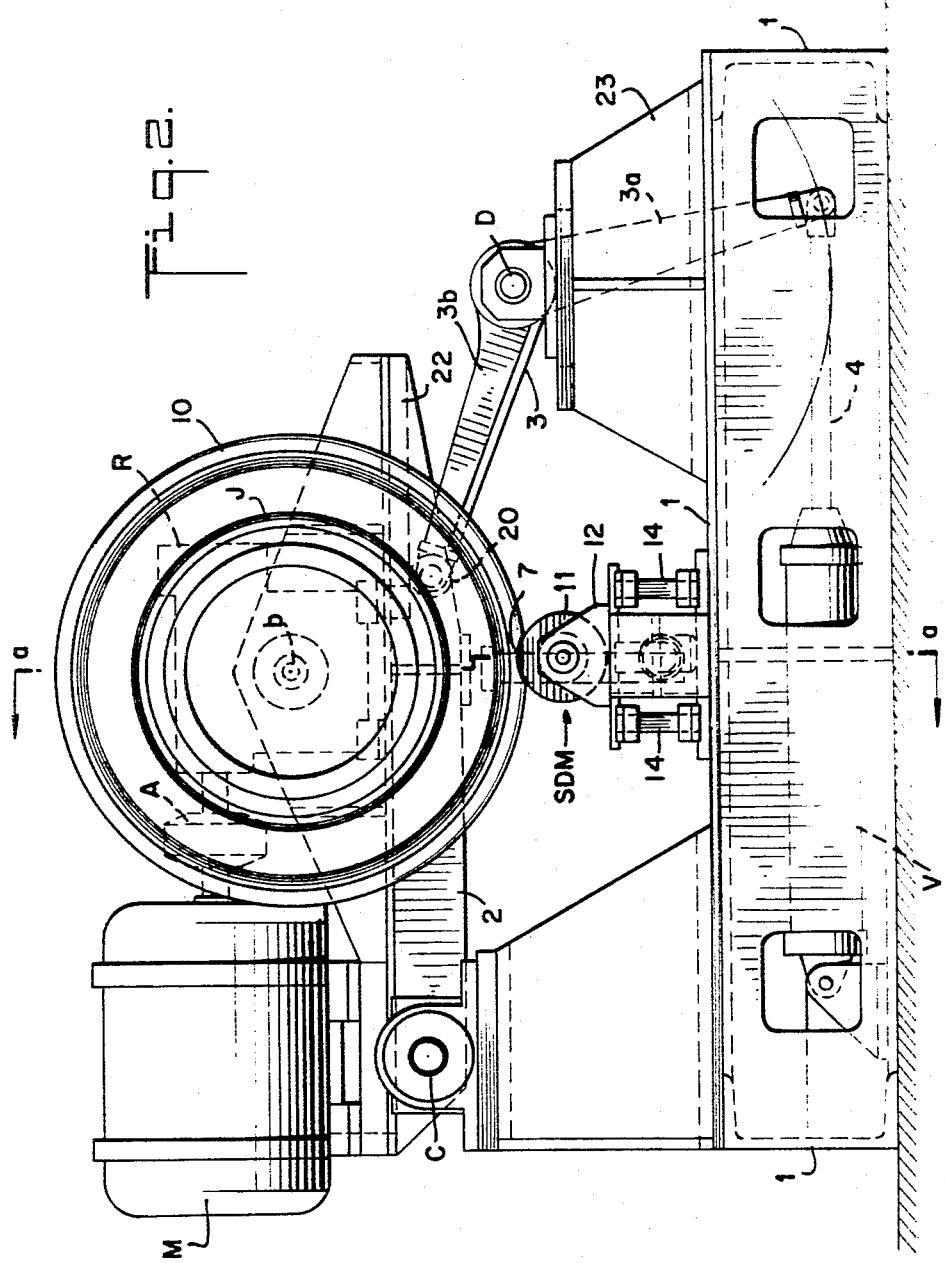
FIG. 2 is a side elevational view of a preferred embodiment of the apparatus of this invention.
Figure 3:
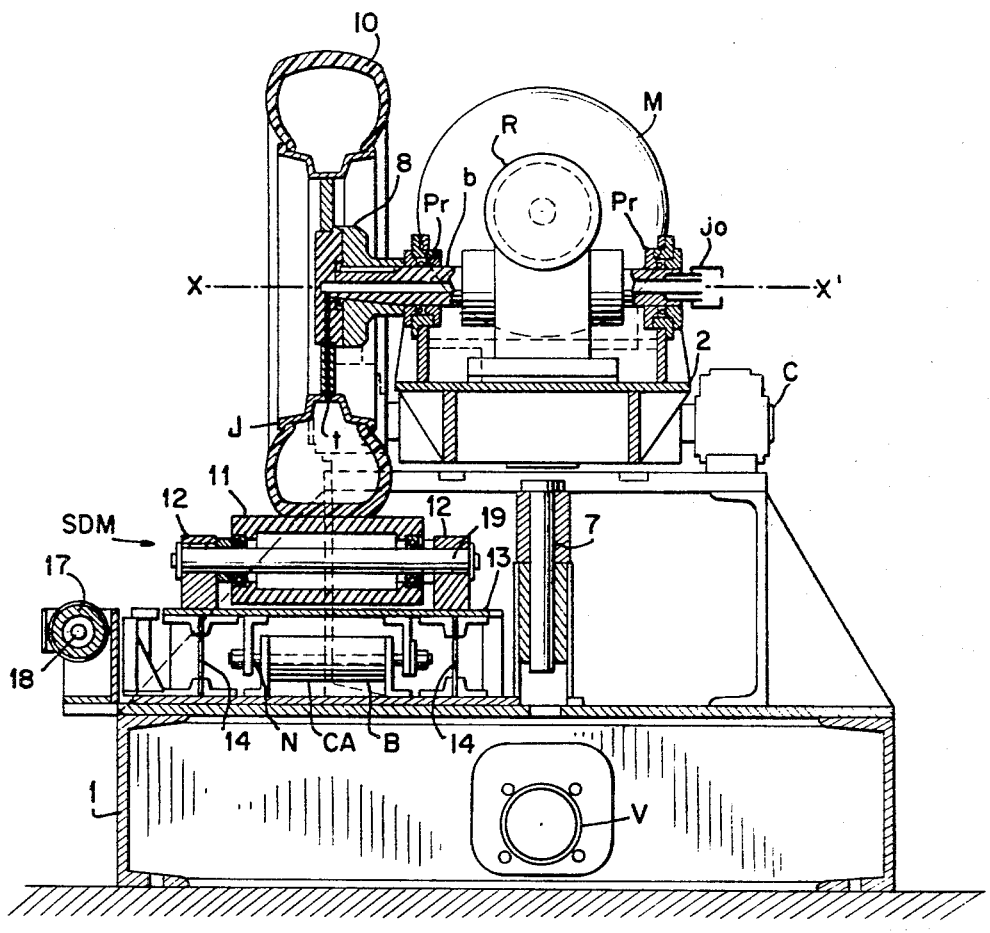
FIG. 3 is a sectional elevational view taken along the line *a—a* of FIG. 2.
Figure 8B:
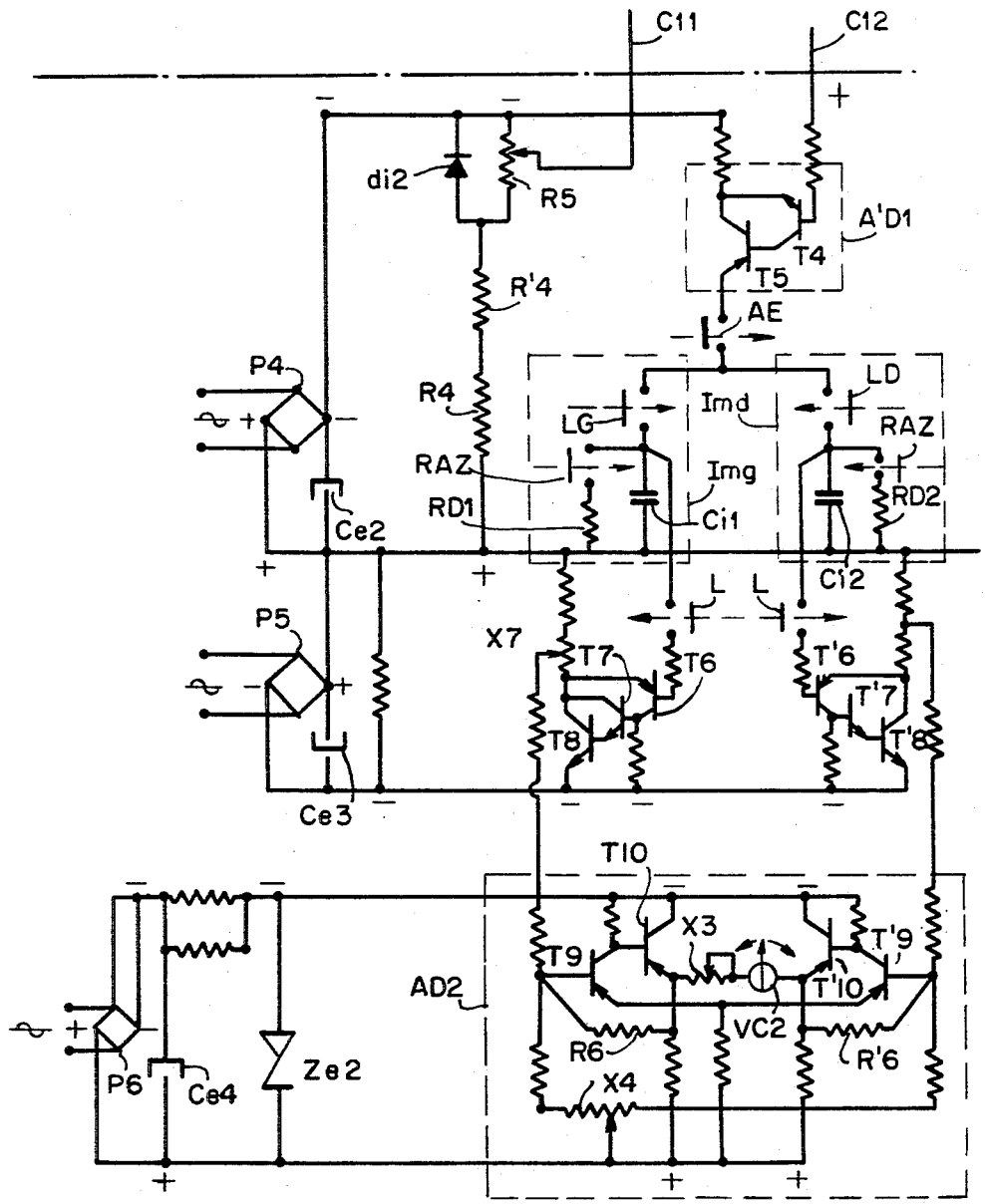
FIG. 8 is a sequence chart to aid in explaining the operation of the apparatus of this invention.

Referring now to FIGS. 2 and 3, a preferred embodiment of an apparatus in accordance with this invention will now be described. The tire testing apparatus comprises a rim or wheel J which is driven in one direction or another by means of a reversible electric motor M through a speed reduction device R. The input shaft of device R is coupled at A with the output shaft of the motor M, and the output shaft $b$ of the device R is coupled to the wheel J by means of a hub assembly 8. A tire 10 to be tested is mounted on the wheel J and inflation pressure for the tire 10 is provided through the hollow shaft $b$ and through passageways and an opening $t$ formed in the wheel J. This enables the tire 10 to be maintained at the proper inflation level during tests. A rotary joint $jo$ is provided at the end of shaft $b$ opposite wheel J to provide for the introduction of inflation air to the hollow shaft $b$.

The shaft $b$ is supported by a pair of spaced roller bearings, each designated $Pr$ in FIG. 3, and the entire assembly, comprising the motor M, the wheel J, the speed reduction unit R and the shaft $b$ is carried on a support plate 2 which is pivotally mounted at C (FIG. 2) on the frame 1 of the apparatus. The axis of pivot C is parallel to the rotational axis X–X' (FIG. 3) of shaft $b$ and tire 10.

In order to provide for raising and lowering the tire 10 relative to frame 1, a pneumatic cylinder V is provided which is pivotally connected at one of its ends (FIG. 2) to frame 1 and which includes a piston rod 4 extending out of the other of its ends. The piston rod 4 is connected to one arm 3a of a bell crank 3 which is pivotally supported at D on a platform 23 fixed to frame 1. The other arm 3b of bell crank 3 is provided at its end opposite pivot D with a roller 20 which is adapted to abut against a wear plate 22 fastened to the underside of support plate 2. Upon actuation of cylinder V to retract piston rod 4 into the cylinder, bell crank 3 rotates about pivot D and causes support plate 2 and tire 10 to be moved from the position shown in FIG. 2 to an upper or raised position. Conversely, when the pneumatic cylinder V is actuated to extend piston rod 4 from the cylinder, bell crank 3 rotates about pivot D to lower the support plate 2 and tire 10 from their upper position to their lower position.

A vertical stop 7 is fixedly mounted atop frame 1 to limit the downward movement of support plate 2 towards frame 1. Stop 7 is adjustable to various heights in order to allow the machine to be used in conjunction with tires of different sizes. The stop 7 serves to prevent damage to the apparatus in the event that plate 2 is lowered with no tire 10 present on rim J.

Referring more particularly to FIG. 3, a stress detecting means, shown generally at SDM and including a roller 11, is provided to generate voltages proportional to the lateral parasitic forces generated by the rolling of tire 10 against the roller 11. During operation, tire 10 is loaded against roller 11 by a predetermined amount which may be varied as desired by adding or removing weights (not shown) to the support plate 2. Roller 11 is mounted to rotate freely about a shaft 19 which is supported parallel to the axis X–X' of tire 10 by bearings 12 on a movable support plate 13. Suitable spacers are provided between the roller 11 and the bearings 12 to prevent axial movement of the roller along the shaft 19 so that any axial movement of the roller 11 is transmitted through shaft 19 and bearings 12 to the movable support plate 13.

The movable plate 13 is supported from the frame 1 of the apparatus by means of four flexible, vertical bars 14, each of which is fastened at one of its ends to the frame 1 and at the other of its ends to the movable plate 13. The bars 14 resiliently bias plate 13 and roller 11 to a null position under tire 10. This arrangement allows that portion of the stress detecting means SDM comprising plate 13, bearings 12, shaft 19 and roller 11 to shift laterally in a substantially horizontal plane under any transverse forces developed during rotation of the tire against the roller 11, in an amount dependent upon the frictional engagement of the tire 10 with roller 11 and the nulling force exerted by bars 14.

In order to detect the lateral movement of roller 11 and plate 13 that occurs, the stress detecting means SDM includes a differential transformer CA (FIG. 3). Transformer CA comprises a movable coil member N which is carried on the undersurface of plate 13, and a stationary coil member B which is fastened to frame 1. Coil member N is aligned parallel with axis X–X' and with the axis of roller 11 so that lateral movement of roller 11 is reflected by a corresponding movement of coil N in coil B.

A calibrating apparatus is provided, comprising a pulley 17 which is rotatable about an axis 18 and which is carried by the frame 1 of the machine. The arrangement is such that a cable (not shown) may be passed around the pulley 17 so as to have one of its ends connected to the movable plate 13, while the other of its ends is subjected to a known force created, for example, by a weight or by a dynamometer. In this matter known forces can be applied to movable plate 13 to calibrate the electrical circuits of the machine, as will appear in greater detail hereinafter.

The pneumatic control circuits employed in raising and lowering tire 10 into engagement with roller 11 and employed in inflating tire 10 have been illustrated in FIG. 4. Air under high pressure is supplied through a conduit Shp from a source (not shown) to a filter-pressure regulator-lubricator assembly, shown generally at 32. From assembly 32, the high pressure air is led to first and second low pressure regulators 27 and 30, respectively, to a distributor valve DV and to a solenoid or electromagnetically operated valve EV2. The regulators 27 and 30 are employed to reduce the high pressure air to a level of about 22 pounds per square inch for use in conjunction with a solenoid or electromagnetically operated valve EV1 to control distributor valve DV (in the case of regulator 27) and in for use in conjunction with a solenoid or electromagnetically operated valve EV3 to maintain the operating pressure within tire 10 (in the case of regulator 30). Solenoid valves EV1, EV2 and EV3 are all shown in their de-energized conditions in FIG. 4.

With solenoid valve EV1 de-energized, distributor valve DV also takes the position shown in FIG. 4. This allows high pressure air to flow from assembly 32 through distributor valve DV, through the check valve of a restrictor-check valve assembly 28a and through line 29a in the direction of the arrow shown to one end of power cylinder V, causing piston rod 4 to be retracted into the power cylinder and lifting the tire under test to its upper position. Thus, under the condition of operation shown in FIG. 4 the tire 10 is in a raised position. The return flow from the opposite end of power cylinder V is through line 29 in the direction of the arrow shown, through the restrictor valve portion of restrictor-check valve assembly 28 and to atmosphere through the distributor valve DV. Solenoid valves EV2 and EV3 serve to block the flow of air through their respective conduits when they are in a state of de-energization.

When the solenoid of valve EV1 is energized, the valve moves downwardly from the position shown in FIG. 4, causing low pressure air from regulator 27 to be directed to the upper end of distributor valve DV. This, in turn, causes the distributor valve to move downwardly from the position shown, reversing the flows of air to and from cylinder V. In this case, the high pressure air flows through distributor valve DV to assembly 28, through the check valve of assembly 28 and to that end of power cylinder V which causes the piston rod 4 to be extended from the power cylinder. The return flow from the opposite end of the power cylinder is through conduit 29a, through the restrictor valve of assembly 28a and thence through the distributor valve DV to atmosphere.

The restrictor valves of assemblies 28 and 28a serve to regulate the speed of movement of the piston 4 within cylinder V. By increasing the restriction to the return flow of air from the power cylinder, the speed of movement of the piston in the cylinder may be slowed down, and vice versa. When piston rod 4 extends out of cylinder V, upon energization of solenoid valve EV1, the tire 10 is lowered into contact with the roller 11 of the machine, as is clear from an inspection of FIG. 2. In normal operation of the machine solenoid valve EV1 is energized at the start of the tire test cycle, concurrently with the energization of solenoid valves EV2 and EV3.

Considering now the effect of energizing the solenoid of valve EV2, when this occurs valve EV2 moves downwardly from the position shown in FIG. 4 to allow high pressure air to flow from assembly 32 through valve EV2 and through the various conduits leading to and through hub assembly 8 and wheel J into the tire 10. Similarly, the energization of the solenoid of valve EV3 allows low pressure air to flow from regulator 30 through valve EV3 and through the same conduits to the interior of tire 10. Accordingly, the air pressure in tire 10 rises.

The increase in pressure in tire 10 is sensed by a pressure or manometer switch MA which is in electrical circuit with the solenoid of valve EV2. Accordingly, when the pressure in tire 10 reaches a predetermined level, close to the final 22 pounds per square inch level desired, pressure switch MA operates, in a manner to be described in greater detail hereinafter, to de-energize the solenoid of valve EV2, thereby shutting off the flow of high pressure air to the tire. However, the tire 10 still continues to be inflated to and kept at its proper level by means of the flow of air through solenoid valve EV3.

When it is desired to deflate the tire 10, solenoid valves EV1 and EV3 are de-energized, returning to the positions shown in FIG. 4. Accordingly, distributor valve DV returns to the position shown in FIG. 4 and air then flows out of the tire 10, through the wheel J, through hub assembly 8, through a check valve 31 in the direction of the arrow shown and through distributor valve DV to atmosphere.

The pressure in the tire 10 at any given time may be determined by means of a pressure gage 33 which may be connected into and out of the air circuit by means of a stopcock 34. A safety valve 35 is also provided to prevent excessive pressures in the tire 10.

Referring to FIG. 5, the electrical integrating and display circuits employed with this invention will now be generally considered. As indicated earlier herein, the movement of the movable coil of the differential transformer CA to one side or the other from its null position causes the differential transformer CA to generate an AC output voltage which increases in potential in accordance with the amount of movement of the movable coil. This output voltage is fed to a demodulator unit DEM. The demodulator unit DEM converts the differential transformer AC output voltage to a corresponding DC voltage which appears at the demodulator output terminals. The relative polarity and level of the voltage appearing at the demodulator output terminals varies, depending upon the direction of rotation and upon the structure of the tire under test, among other things.

The output voltage of the demodulator unit DEM is led through the contacts INV of an inverter relay to a first differential amplifier AD1, where this voltage is amplified. As will appear hereinafter, contacts INV change position in accordance with changes in the direction of rotation of the tire under test so as to interconnect the demodulator unit DEM output and the differential amplifier AD1 input in such a manner that the polarity of the voltage applied to the differential amplifier AD1 is the same, regardless of the direction of rotation of the tire under test.

The differential amplifier AD1 provides amplified output voltages which are representative of the instantaneous values of the resultant forces Fr1 and Fr2 (FIG. 1) which the tire exerts on roller 11. The variations of forces Fr1 and Fr2 may be observed on a voltmeter VC1 associated with differential amplifier AD1 and the voltmeter may be calibrated to read such forces in kilograms (or ounces if desired). By observing the maximum and minimum excursions of the pointer on voltmeter VC1 throughout the test cycle, the operator can determine the value of the sinuousness force Fs associated with the tire under test.

The output of differential amplifier AD1 is led, during one revolution of the tire under test in a first direction, through relay contacts AE and relay contacts LG to a first integrating and memory circuit unit Img. During a second revolution of the tire under test in a second direction, the output of amplifier AD1 is led through relay contacts AE and relay contacts LD to a second integrating and memory circuit unit Imd. Thereafter, the voltages stored in the two integrating and memory circuit units Img and Imd are led to a second differential amplifier AD2 where these voltages are algebraically summed and applied to a calibrated voltmeter VC2 which displays the value of the conicity force Fc (FIG. 1) directly in kilograms (or ounces, if desired and so calibrated).

Referring now to FIG. 6a for a consideration in greater detail of the electrical integrating and display circuits, the differential transformer CA includes the aforementioned movable coil member N having a winding e3 therein which is supplied with AC voltage at its input terminals A1–A2. As indicated earlier herein, the coil N is carried by and movable with the support plate 13 (FIG. 3) and moves inside the coil B of differential transformer CA.

The stationary coil B of differential transformer CA includes two windings e1 and e2. During rotation of the tire under test in a first direction, the voltage induced in one of the windings (e.g., winding e1) is greater than that induced in the other. During rotation of the tire in a second direction, the voltage induced in the other winding (e.g. winding e2) is greater in amplitude. This is due to the movement of coil N and its associated winding e3 to one side or the other of its null position under the influence of the rotation of the test tire.

The AC voltages generated in windings e1 and e2 are led to and rectified by respective bridge rectifiers P1 and P2 of demodulator DEM to provide a DC output voltage at the output terminals B11 and B12 of the demodulator, the voltages on terminals B11 and B12 each being positive relative to the voltage on the lead which interconnects the negative terminals of rectifiers P1 and P2. The output of bridge rectifier P1 is shunted by serially connected resistors R1 and R2 and is also shunted by a capacitor C1. Similarly, the output of bridge rectifier P2 is shunted by serially connected resistors R'1 and R'2 and is also shunted by a capacitor C2. A potentiometer X6, connected between resistor R'2 and the junction of resistor R2 with the negative sides of rectifiers P1 and P2, is utilized to adjust the output of demodulator unit DEM to zero volts when no tire is loading the differential transformer CA and the winding e3 of movable coil N is at its null position.

A potentiometer X5, which is in series with relay contacts DE across resistor R2, provides for dynamic balancing of the demodulator DEM and differential transformer CA. Potentiometer X5 may be so adjusted that the output voltages across terminals B11 and B12 during rotation of a tire in one direction will be equal to but reversed from the corresponding voltages across these terminals when the tire under test is run in the same direction but the tire itself reversed with respect to the wheel J. Thus, potentiometer X5 serves to dynamically balance the output of demodulator DEM to provide equal but opposite outputs from a given tire rotating in a given direction when the tire is mounted with one and then the other of its sidewalls facing outwardly of the machine. Contacts DE are closed during adjustment of potentiometer X5, as well as during actual testing of tires, as will appear in greater detail hereinafter.

The arrangement of differential transformer CA and demodulator DEM is such that, relative to the potential at the junction of the leads interconnecting resistors R2 and R'2 with rectifiers P1 and P2, the potentials at terminals B11 and B12 when a test tire is rotated under load are both positive, although each may be positive or negative relative to the other, depending on the direction of rotation of the tire. In the first or forward direction of rotation of the test tire the inverter relay contacts INV would be in the position shown in FIG. 6a, interconnecting demodulator output terminal B12 with the input terminal D12 of differential amplifier AD1, and interconnecting output terminal B11 with input terminal D11. In this case the potential of terminals B12 and D12 would be more positive than that of terminals B11 and D11. The voltage across output terminals B11 and B12 is also applied across an output resistor R0. When the direction of rotation of the tire is changed, the inverter relay contacts INV switch from the position shown in FIG. 6a to a position to the right of that shown. Accordingly, although the output terminal B11 of demodulator DEM becomes positive relative to the output terminal B12 due to the change in direction of rotation of the tire, the more positive terminal B11 is connected to the input terminal D12 of differential amplifier AD1 and the less positive terminal B12 is connected to the input terminal D11 of the differential amplifier. As a result of the foregoing, the demodulator output voltage during testing of a tire is always applied to the input terminals D11 and D12 of the differential amplifier with the potential of terminal D12 more positive than that of terminal D11.

The differential amplifier AD1 comprises a pair of amplifier units, each of which includes three NPN type transistors, identified at T1, T2 and T3 in one amplifier (hereinafter the left hand amplifier) and at T'1, T'2 and T'3 in the other amplifier (hereinafter the right hand amplifier). A bridge rectifier unit P3 is employed to provide a source of DC voltage for the differential amplifier AD1. The DC output of rectifier P3 is filtered and stabilized by means of an electrochemical filter capacitor Ce1 and a polarized Zener diode Ze1, respectively. An AC voltage is supplied to rectifier P3 from a source (not shown) via the terminals B1 and B2. The output polarity of the bridge rectifier P3 is arranged so that the emitters of transistors T1, T2 and T3 and transistors T'1, T'2 and T'3 are negatively biased relative to the collectors of these transistors.

A negative feedback resistor R3 is connected between the output terminal C11 and input terminal D11 of the left hand amplifier of differential amplifier AD1, and a similar negative feedback resistor R'3 is connected between the output terminal C12 and the input terminal D12 of the right hand amplifier of the differential amplifier.

A potentiometer X1 is utilized to statically balance the outputs of the left and right hand amplifiers of differential amplifier AD1. The potentiometer X1 serves to vary with respect to one another the negative biases applied to the input terminals D11 and D12 of differential amplifier AD1 so that the differential amplifier has no output, as read on a voltmeter VC1, when there is no load applied to the roller 11 (FIG. 2).

The output terminals C11 and C12 of the differential amplifier AD1 are interconnected by a series circuit comprising the voltmeter VC1 and a potentiometer X2, the foregoing two components being in parallel with a diode element di1 which also is connected between the output put terminals C11 and C12. The voltmeter VC1 serves to provide a visual indication of the output of differential amplifier AD1, which output corresponds to the resultant forces Fr1 and Fr2 shown in FIG. 1. The diode di1 serves to prevent damage to voltmeter VC1 in the event the voltage across output terminals C11 and C12 should be inadvertently reversed in polarity.

The potentiometer X2 is employed in calibrating the scale of voltmeter VC1 to agree with known values of the forces Fr1 and Fr2. This calibration is performed in conjunction with the calibrating pulley 17 (FIG. 3) heretofore discussed. In effecting calibration of voltmeter VC1 a known weight, for example 10 kilograms, is attached to one end of a cable which is wrapped about pulley 17 (FIG. 3) and fastened at its other end to the movable platform 13, causing the platform to shift to the left and causing an output voltage to be applied across voltmeter VC1. Potentiometer X2 is then adjusted to make the indicator of the voltmeter deflect about 20% of full scale, and a notation is then made on the scale to indicate the point corresponding to 10 kilograms. Thereafter, different points corresponding to 5, 15, 20 and 25 kilograms of calibration force may be marked on the scale of voltmeter VC1 to facilitate reading the instantaneous forces $Fr1$ and $Fr2$.

Referring to FIG. 6b, a negative bias is applied to terminal C11 of differential amplifier AD1 in order to insure that this terminal will be more negative than terminal C12 relative to a follow-up amplifier A'D1 of FIG. 6b. This negative bias is provided by a voltage dividing network comprising resistors R4 and R'4 and a potentiometer R5 connected in series across the output of a bridge rectifier P4. An electrochemical filter capacitor $Ce2$ is also connected across the output of bridge rectifier P4 to smooth out the DC flow from the rectifier. The potentiometer R5 is shunted by a diode element $di2$ which cooperates with the potentiometer in establishing the minimum level of negative DC voltage at point C11.

The output from terminals C11 and C12 of differential amplifier AD1 is directed to the input of the aforementioned follow-up amplifier A'D1, which amplifier serves to increase the level of the output of the differential amplifier. The follow-up amplifier A'D1 comprises transistors T4 and T5.

The output of follow-up amplifier A'D1 is directed through relay contacts AE and one or the other of relay contacts LG and LD to the input of one or the other of respective integrating and memory circuit units $Img$ and $Imd$, depending on the direction of rotation of the tire under test. When the tire is rotating in the first or forward direction, for example, the relay which controls contacts LG is energized, as hereinafter described, and contacts LG in FIGURE 6b are closed. Accordingly, upon energization of the relay which controls contacts AE, as hereinafter described, contacts AE close, causing the output of follow-up amplifier A'D1 to be connected to and to charge the integrating capacitor $Ci1$ of integrating and memory circuit unit $Img$. Contacts AE close at the start of the second revolution of the test tire in its first direction and remain closed during the entire second revolution of the tire in the embodiment described herein. In this embodiment the tire makes three revolutions in each direction, as will be described in greater detail hereinafter. Contacts AE also close at the start of and remain closed during the second revolution of the tire in its second direction of rotation, at which time contacts LG are open and contacts LD are closed, causing the output of follow-up amplifier A'D1 to be connected to and to charge the integrating capacitor $Ci2$ of integrating and memory circuit unit $Imd$.

Integrating capacitors $Ci1$ and $Ci2$ are each shunted by a circuit that include a set of normally open relay contacts RAZ and, in the case of integrating capacitor $Ci1$, a resistor RD1 and, in the case of integrating capacitor $Ci2$, a resistor RD2. The two sets of relay contacts RAZ are normally open during the entire test cycle of the tire, closing only at the completion of the test cycle when it is desired to reset the apparatus preparatory to starting a new tire test cycle.

Assuming that the test tire has been rotated three revolutions in each direction and that the capacitors $Ci1$ and $Ci2$ have been charged to levels corresponding to the integrals of the resultant forces $Fr1$ and $Fr2$ of FIG. 1, respectively, at the end of the third revolution of the tire in the second direction the relay which controls contacts L in FIG. 6b energizes, in a manner to be described in greater detail hereinafter. Accordingly, contacts L close and the charges on integrating capacitors $Ci1$ and $Ci2$ are applied to the respective inputs of left hand and right hand amplifiers located downstream of the capacitors, which amplifiers each comprise three transistor stages involving transistors T6, T7 and T8 in one case and transistors T'6, T'7 and T'8 in the other. Suitable negative and positive biasing voltages are developed for the aforesaid left and right hand amplifiers by means of a bridge rectifier P5 which is shunted by an electrochemical filter capacitor $Ce3$. A potentiometer X7 is provided in order to adjust the output of the left hand amplifier relative to that of the right hand amplifier to insure that the amplified signals present at the outputs of the two amplifiers are proportional to the levels of the signals presented to the inputs of the two amplifiers.

The output signals from the aforesaid left and right hand amplifiers are led to the inputs of a second differential amplifier AD2. Differential amplifier AD2 includes two amplifiers, a left hand one and a right hand one as viewed in FIG. 6a, the outputs of which are shunted by a series circuit comprising a potentiometer X3 and a calibrated voltmeter VC2. The left hand amplifier of differential amplifier AD2 comprises two transistors T9 and T10 and the right hand amplifier comprises transistors T'9 and T'10. The potentiometer X3 is employed to calibrate the voltmeter VC2 so that the voltmeter will provide readings of the conicity force Fc directly in kilograms. In this case the voltmeter VC2 is calibrated by allowing a known weight, for example 10 kilograms, to be applied via a cable and the pulley 17 (FIG. 3) to the movable platform 13 for a known period of time corresponding to the time it takes for the test tire to rotate one turn (e.g., 2 seconds, at 30 r.p.m.). In the time corresponding to the rotation of the tire on turn in the opposite direction the weight would be removed from the pulley 17 so that the voltmeter VC2 should display a conicity force Fc reading of ten kilograms to the left. Potentiometer X3 may be suitably adjusted so as to have the voltmeter pointer deflect about 40% of full scale to the left and this point is identified as 10 kilograms. Similar markings may be made at the 5, 15, 20 and 25 kilogram points to facilitate taking later readings and corresponding points should be identified for conicity forces which are directed to the right of platform 3, as viewed in FIG. 3.

Another potentiometer X4 is provided in differential amplifier AD2 which serves the function of providing a means to balance differential amplifier AD2 for a zero output under no load conditions of the roller 11. Resistors R6 and R'6 serve as negative feedback resistors for the left and right hand amplifiers, respectively, of differential amplifier AD2. Also, a bridge rectifier P6 is employed to provide DC voltage for the differential amplifier AD2, and electro-chemical filter capacitor $Ce4$ and a Zener diode $Ze2$ are employed to regulate the DC output of the rectifier P6.

Figure 7A:
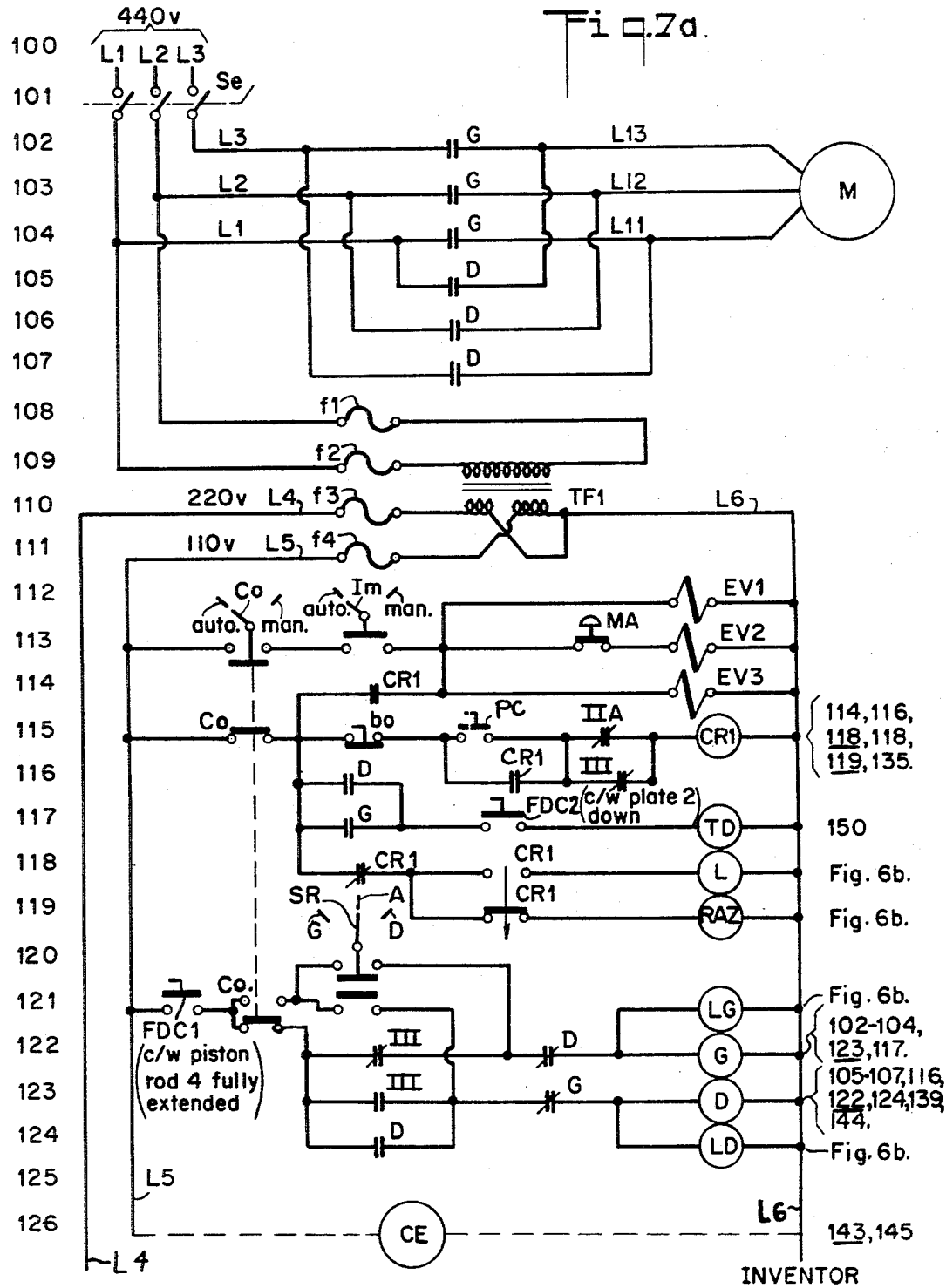
FIGS. 7a and 7b, together, show an electrical schematic diagram of one arrangement for automatically controlling the operation of the apparatus of this invention.
Figure 7B:
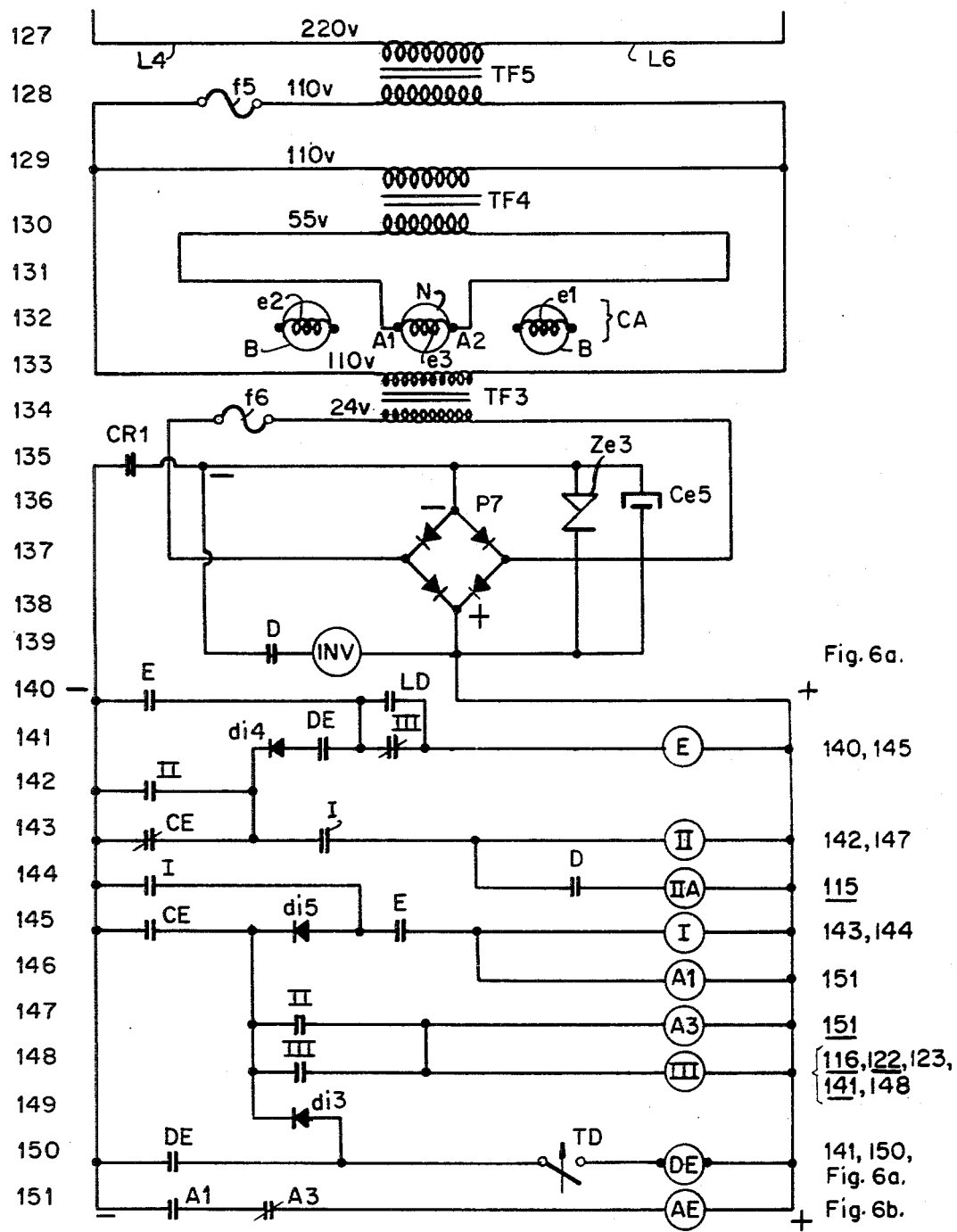
Figure 8:
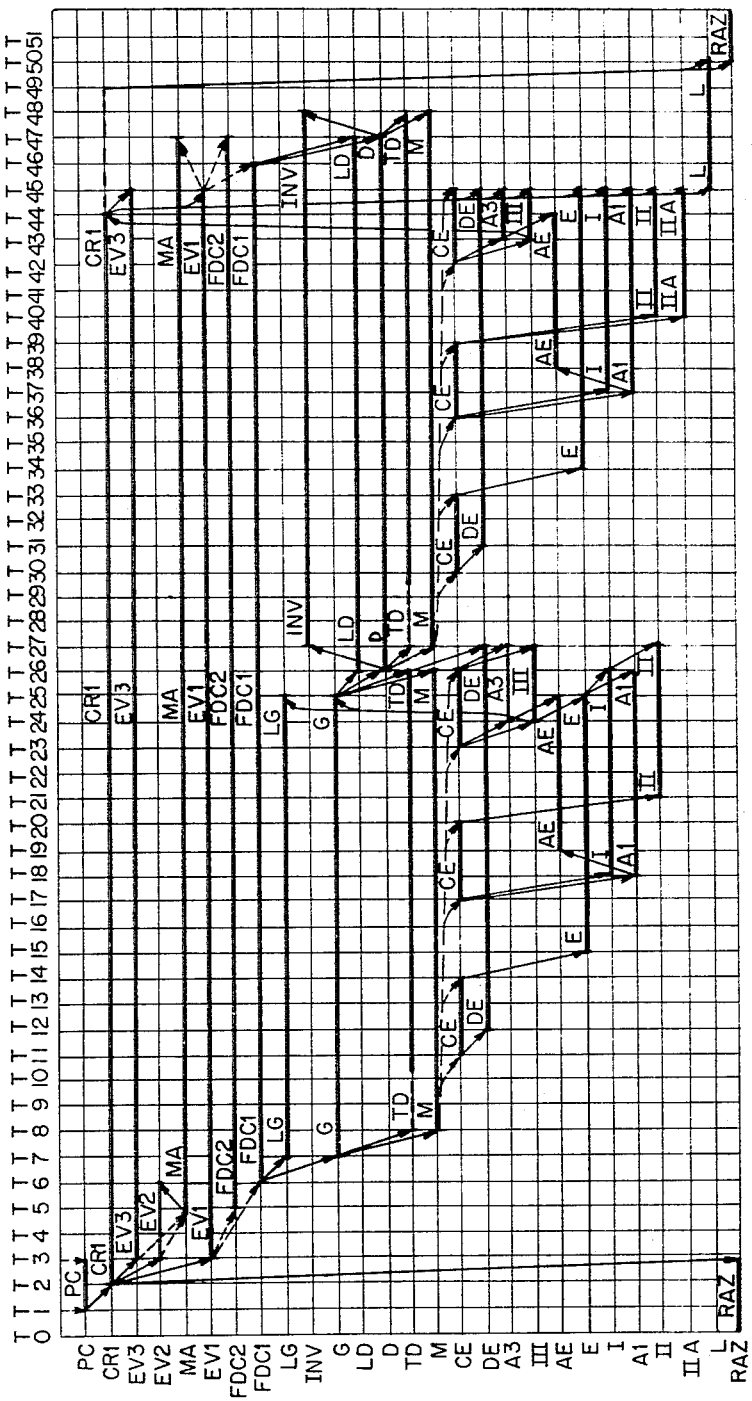

Referring now to FIGS. 7a, 7b and 8, the electrical system which automatically controls the tire testing machine has been schematically illustrated in FIGS. 7a and 7b and a sequential action chart which is useful in analyzing the operation of this electrical control system has been illustrated in FIG. 8. The sequential action chart of FIG. 8 employs guide grids comprising a plurality of relatively light, horizontal "component" lines and a plurality of relatively light, vertical "time" lines. The electrical component represented by each horizontal component line is listed at the left edge of the FIG. 8 chart, the component list forming a vertical column at the left edge thereof. Similarly, the time represented by each vertical time line is listed across the top of the chart.

When a given light component line becomes heavy (e.g., component line PC becomes heavy at time T–1), it indicates that the electrical component involved becomes energized at that time or that a given set of swich contacts becomes closed at that time, as he case may be. When the heavy component line changes back to a light component line (e.g., component line PC becomes light at time T-3), it indicates that the electrical component involved becomes de-energized at that time or that the given set of switch contacts opens at that time.

Diagonal solid line arrows starting at the beginning or end of one heavy component line or ending at the beginning or end of a higher or lower component line at a later time indicate that the first component electrically controls the second component and, hence, the solid line arrows are hereinafter referred to as "electrical action lines." Similarly, diagonal broken line arrows starting at the beginning or end of one heavy component line and ending at the beginning or end of another heavy component line at a later time indicate that the first component mechanically actuates or controls the component. Hence, the broken line arrows are referred as to "mechanical action lines."

Examples of the foregoing are as follows. When control relay CR1 becomes energized at time T-2, it causes the solenoids of valves EV3, EV2 and EV1 to become concurrently energized at time T-3 and also causes relay RAZ to become de-energized at the same time. These four actions are represented by the four electrical action lines (solid line arrows) extending from heavy component line CR1 at time T-2 to, respectively, the heavy component lines EV3, EV2, EV1 and RAZ at time T-3. Similarly, the energization of the solenoid of valve EV1 at time T-3 causes a mechanical movement to occur (the extending of piston rod 4 out of pneumatic power cylinder V) which results in the closing of limit switch contacts FDC2 at time T-5 and results in the closing of limit switch contacts FDC1 at time T-6. These actions are represented by the mechanical action lines (broken line arrows) extending from the start of heavy component line EV1 to the start of the heavy component lines FDC2 and FDC1.

Time-delay features of time-delay relays are represented on the sequential action chart by means of broken heavy component lines. When a light component line becomes a broken heavy component line, it indicates that a time-delay relay has become energized but that the time-delay contacts thereof have not yet followed the movement of the relay. When such contacts finish their timing period and change condition, this action is represented by the changing of the broken heavy component line into an unbroken heavy component line. An example of this may be seen in the case of time-delay relay TD which energizes at time T-8. Although this relay becomes energized at that time, its time delay contacts do not shift position until after the expiration of the time-delay period a time T-10, as indicated by the change of the broken heavy component line into an unbroken heavy component line at time T-10.

In the case of time-delay relays on which the time-delay function is effective upon de-energization of the relay, an unbroken, heavy component line indicates that the relay is energized, while a broken heavy component line following this shows that the relay has been de-energized but that the time-delay contacts have not yet shifted. When these contacts finally shift, the broken heavy component line changes to a light component line. An example of this may be seen in the case of control relay CR1 which de-energizes at time T-44. Although the relay CR1 de-energizes at this time, one set of its contacts do not shift position with the de-energization of the relay but, instead, waits until the time-delay period has expired at T-49 before shifting position. This time-delay period is indicated by the broken heavy line extending between time T-44 and time T-49.

As indicated earlier, the light, vertical, time lines of the sequential action chart represent the passage of time. The passage of time is treated on a relative basis rather than on an absolute basis. At any given time, as represented by a time line, the condition of any one of the electrical components of the apparatus may be determined relative to the conditions of the remaining electrical components of the apparatus. This facilitates analysis of the electrical control system schematic drawings of FIGS. 7a and 7b and also aids in understanding the operation of the integrating and display circuits of FIGS. 6a and 6b.

Referring now to FIGS. 7a and 7b, which together comprise an electrical schematic drawing of the electrical control system for the tire testing machine, a line numbering system has been employed to facilitate description of the system. The line numbers have been listed on the left side of each of FIGS. 7a and 7b and run consecutively from line No. 100 in FIG. 7a through line No. 151 in FIG. 7b. FIG. 7a contains line numbers 100 through 126 of the electrical system and FIG. 7b contains line numbers 127 through 151 of the electrical system.

The line numbers in which the contacts of relays appear have been listed on the right side of FIGS. 7a and 7b, adjacent to the relays which control them, and underlining has been employed to denote normally closed contacts. Thus, referring to FIG. 7a, control relay CR1 (line 115) is provided with normally open relay contacts positioned in lines 114, 116, 118 and 135 and is provided with normally closed relay contacts positioned in lines 118 and 119. The arrow passing through the vertically aligned contacts of relay CR1 in lines 118 and 119 indicates that these contacts are of the time-delay type and that the delay in shifting of the contacts occurs upon de-energization of relay CR1.

Various of the relays are provided with contacts which are positioned in the integrating and display circuits of FIGS. 6a and 6b as well as (or in lieu of) contacts positioned in the electrical control system of FIGS. 7a and 7b. Thus, the normally open contacts of control relay L (line 118) are positioned in FIG. 6b (in the output circuitry of each of integrating and memory circuit units Img and Imd), as indicated in the margin at the right side of the relay. Similarly, relay DE (line 150) is provided with normally open contacts positioned in lines 141 and 150, and is also provided with normally open contacts positioned in FIG. 6a (in the circuitry of demodulator DEM).

Before going into a detailed discussion of the operation of the electrical control system of FIGS. 7a and 7b, a number of the elements involved in correlating the actions of the mechanical elements of the machine with the electrical circuits of the machine will now be considered. Referring to FIG. 7a, at line 117, a limit switch FDC2 has been illustrated, the contacts of which are in the normally open position until the limit switch is actuated. Limit switch FDC2 is actuated when the support plate 2 (FIG. 2) reaches its lower position so that the test tire is in contact with the roller 11. Similarly, another limit switch FDC1 is provided at line 121, the contacts of which are in the normally open position until the limit switch is actuated. Limit switch FDC1 cooperates with the piston rod 4 (FIG. 2) and becomes actuated when the piston rod 4 reaches its fully extended position subsequent to lowering the test tire 10 into contact with the roller 11.

A photoelectrically operated relay CE is illustrated at line 126 in FIG. 7a. This relay is provided with a set of normally closed contacts in line 143 and a set of normally open contacts in line 145. The state of energization of photoelectrically operated relay CE is dependent upon the rotation of the tire under test in the machine, and is controlled by means of a disc which rotates in synchronism with the tire, the disc being interposed between the photocell of relay CE and its light source in such a manner as to only block the light beam between the light source and the photocell of the relay during one-half of each revolution of the test tire.

Assuming that a test tire 10 has been placed on the wheel J, that the piston rod 4 is retracted into power cylinder V, that the machine has been previously shut down and that it is now desired to start operation, this description will now continue with reference to FIGS. 7a, 7b and 8.

A three phase supply voltage of, for example, 440 volts AC is delivered to the electrical control system by means of three conductors L1, L2, and L3 (line 100) through a disconnect switch Se (line 101). With disconnect switch Se (line 101) closed, 440 volt AC is available, through fuses f1 and f2 to the primary winding (line 109) of a step down transformer TF1.

Tranfsormer TF1 is employed to reduce the 440 volt supply voltage to suitable lower voltages of, for example, 220 volts in one secondary winding thereof (line 110) and 110 volts in another secondary winding thereof (line 110). One side of the 220 volt output circuits is connected to a conductor L4 (line 110) by a fuse f3 (line 110) and one side of the 110 volt output circuit is connected to a conductor L5 (line 111) by a fuse f4 (line 111). The other sides of the foregoing secondary windings are connected to a common conductor L6 (line 110).

The 220 volt output of transformer TF1 (line 110) is connected by conductors L4 and L6 to the primary winding (line 127) of a transformer TF2. The secondary winding (line 128) of transformer TF2 is protected by a fuse f5 (line 128) and serves to energize the primary windings (lines 133 and 129) of step down transformers TF3 and TF4, respectively. The secondary winding (line 130) of transformer TF4 provides a voltage of, for example, 55 volts AC to the terminals A1 and A2 of movable coil N of the differential transformer CA, thereby to energize winding e3 (FIG. 6a) of the differential transformer. The secondary winding (line 134) of transformer TF3 serves to provide a voltage of, for example, 24 volts AC through a fuse f6 (line 134) to the input terminals of a bridge rectifier P7 (lines 136 through 138), the 24 volt DC output of which is employed in the control circuits shown in lines 135 through 151 of FIG. 7b. The 110 volt onput of the secondary winding (line 110) of transformer TF1, on the other hand, is directed by the conductors L5 and L6 to the electrical control circuitry located between lines 111 and 126 of FIG. 7a and is employed in the control of such circuits.

Assuming that switch Co (line 112) is in the "auto" position shown, its contacts in line 113 will be open, its contacts in line 115 will be closed, and its contacts in line 121 will be in the position shown in FIG. 7a. Also, assuming switch Im (line 112) is in the "auto" position shown, its contacts in line 113 will be open. Similarly, assuming switch SR (line 119) is in the A position shown, its contacts in line 120 will be open and its contacts in line 121 will be open.

For the purpose of setting forth the initial conditions existing at time T–0 in FIG. 8, it will be assumed that disconnect switch Se (line 101) has previously been closed, that automatic operation of the machine has not yet been initiated, that a tire is in place on wheel J and that platform 2 is in its upper position. Under these circumstances, all of the electrical components except relay RAZ (line 118) will be in their de-energized or de-actuated condition, as shown at time T–0 in FIG. 8. Relay RAZ (line 118) is energized at that time by means of a circuit including conductors L5 and L6, contacts Co (line 115), the normally closed contacts CR1 in line 118, and the normally closed contacts CR1 in line 119. Accordingly, the two sets of contacts RAZ in FIG. 6b are closed, discharging the integrating capacitors Ci1 and Ci2 of the integrating and memory circuit units Img and Imd, respectively.

To initiate automatic operation of the machine, a "machine start" push-button switch PC (line 115) is manually depressed, as shown at time T–1. As a result of this, control relay CR1 (line 115) becomes energized at time T–2 through a circuit including contacts Co (line 115), the normally closed contacts of a "machine stop" push-button switch bo (line 115), contacts PC (line 115) and contacts II A (line 115). Upon energization of relay CR1 (line 115), its normally open contacts in lines 114, 116 and 135 close and its normally closed contacts in lines 118 and 119 open. The closing of contacts CR1 in line 116 provides an alternate source of energization for relay CR1 (line 115) so that, upon subsequent deactuation of push-button switch PC (line 115) at time T–3, relay CR1 (line 115) remains energized. The opening of the normally closed contacts CR1 in line 118 causes relay RAZ (line 119) to become de-energized at time T–3 and the two sets of contacts RAZ in FIG. 6b open, preconditioning the integrating capacitors Ci1 and Ci2 for subsequent charging. The closing of the normally open contacts CR1 in line 118 at time T–2 is without further effect, as is the opening of the normally closed contacts CR1 in line 119 and the closing of the normally open contacts CR1 in line 135. However, the closing of contacts CR1 in line 114 at time T–2 results in the concurrent energization of solenoid valves EV1 (line 112), EV2 (line 113), and EV3 (line 114) at time T–3.

As indicated earlier in connection with the description of the pneumatic control circuits of FIG. 4, the energization of solenoid valves EV2 (line 113) and EV3 (line 114) at time T–3 causes high and low pressure air to simultaneously flow into the test tire 10 to inflate the same. When the pressure of the tire reaches a predetermined level, close to the final 22 pounds per square inch level desired, the manometer switch MA (line 113) actuates, as shown at time T–5. Accordingly, contacts MA in line 113 open, de-energizing solenoid valve EV2 (line 113) at time T–6. When solenoid valve EV2 (line 113) de-energizes at time T–6, the flow of high pressure air to tire 10 is discontinued. However, since solenoid valve EV3 (line 114) remains energized, the flow of low pressure air to the tire continues in order to insure that the tire reaches and stays at its proper inflation level during the test.

The enegization of solenoid valve EV1 (line 112) at time T–3 causes the support plate 2 (FIG. 2) to start moving down in the manner described earlier in conncection with the discussion of FIG. 4. When the support plate 2 reaches its lower position, limit switch FDC2 (line 117) actuates, at time T–5, without further effect. When piston rod 4 becomes fully extended from power cylinder V, limit switch FDC1 (line 121) becomes actuated, at time T–6, initiating the next sequence of actions.

Upon actuation of limit switch FDC1 (line 121) at time T–6, its contacts in line 121 close, thereby concurrently energizing relay LG (line 121) and relay G (line 122) at time T–7. Upon energization of relay LG (line 121), its single set of contacts in FIG. 6b close, without further effect. Upon energization of relay G (line 122), its normally open contacts in lines 102 through 104 close, energizing drive motor M (line 103) at time T–8. This causes the test tire 10 to start rotating in its first direction of rotation. Also, the normally closed contacts of relay G in line 123 open, without further effect, and the normally open contacts of relay G in line 117 close to cause energization of time-delay relay TD (line 117) at time T–8. The time-delay contacts TD in line 150 then commence their time-delay period prior to closing, as indicated by the broken heavy TD component line in FIG. 8 extending from time T–8 to time T–10. When the time-delay period of contacts TD (line 150) is completed at time T–10, these contacts close without further effect.

Recalling that the drive motor M (line 103) was energized at time T–8, rotation of the drive motor M causes a disc to intermittently intercept a light beam extending between a light source and the photocell of photoelectrically operated relay CE (line 126). Accordingly, shortly after rotation of the test tire 10 commences, relay CE (line 126) becomes energized (at time T–11), causing its normally closed contacts in line 143 to open and its normally open contacts in line 145 to close and signifying the start of the first revolution of the test tire in its first direction. The opening of contacts CE in line 143 is without further effect. The closing of contacts CE in line 145 causes the relay DE (line 150) to become energized at time T–12 through a circuit including contacts CE (line 145), diode di3 (line 149) and the now closed time-delay contacts TD (line 150). Upon energization of relay DE (line 150) at time T–12, its normally open contacts in each of lines 141 and 150 close, without further effect, and its single set of contacts in FIG. 6a close, without further effect.

With the continued rotation of the tire under test, photoelectrically operated relay CE (line 126) becomes de-energized at time T–14, causing its contacts in line 143 to close and its contacts in line 145 to open and signifying the end of the first half of the first revolution of the test tire. The opening of contacts CE in line 145 is without further effect (the relay DE remaining energized through the now closed contacts DE in line 150). However, the closing of contacts CE in line 143 cause the relay E (line 141) to become energized at time T–15 through a circuit including the contacts CE in line 143, a diode di4 (line 141), the now closed contacts DE in line 141 and the closed contacts III in line 141. As a result of this, the normally open contacts of relay E in lines 140 and 145 close, without further effect, the closing of contacts E in line 140 serving to provide an alternate source of energization to relay E (line 141) which bypasses contacts CE (line 143), diode di4 (line 141) and contacts DE (line 141).

At the start of the second revolution of the test tire in its first direction, the continued rotation of the tire causes the photoelectrically operated relay CE (line 126) to become energized at time T–17. The energization of relay CE (line 126) at time T–17 causes its contacts in line 143 to open and its contacts in line 145 to close. The opening of contacts CE in line 143 is without further effect. However, the closing of contacts CE in line 145 causes the concurrent energization of relay I (line 145) and relay A1 (line 146), at time T–18, through a circuit including the contacts CE (line 145), a diode di5 (line 145) and the now closed contacts E in line 145.

The energization of relay I (line 145) at time T–18 causes its contacts in line 143 and 144 to close, the former being without further effect and the latter providing an alternate source of energization for relay I that by-passes the contacts CE (line 145) and the diode di5 (line 145). The energization of relay A1 (line 146) at time T–18 causes its contacts in line 151 to close, energizing relay AE (line 151) at time T–19.

The energization of relay AE (line 151) at time T–19 causes its single set of contacts in FIG. 6b to close, thereby to initiate the charging of integrating capacitor Ci1 of integrating and memory circuits unit Img, through the now closed contacts LG in FIG. 6b. Thus, immediately after the start of the second revolution of rotation of the test tire in its first direction of rotation, integrating capacitor Ci1 begins charging to integrate the output signal coming from follow-up amplifier A'D1, which output signal is representative of the force Fr1 (FIG. 1). As the integration process proceeds, the tire under test completes the first half of its second revolution, at which time the light beam to the photocell of photoelectrically operated relay CE (line 126) is interrupted, de-energizing relay CE (line 126) at time T–20.

The de-energization of relay CE (line 126) at time T–20 causes its contacts in line 145 to open, without further effect, and causes its contacts in line 143 to close, energizing relay II (line 143) at time T–21 through the now closed contacts I in line 143. Upon energization of relay II (line 143), its contacts II in line 142 close, providing an alternate source of energization for relay II, and its contacts II in line 147 close, without further effect.

The integrating cycle which initiated with the energization of relay AE (line 151) at time T–19 continues during further rotation of the test tire in its second revolution. However, at the end of the second revolution of the tire, photoelectrically operated relay CE (line 126) again becomes energized, at time T–23. Upon energization of relay CE (line 126) at time T–23, its contacts in line 143 open, without further effect, and its contacts CE in line 145 close, concurrently energizing relay A3 (line 147) and relay III (line 148) at time T–24.

The energization of relay A3 (line 147) at time T–24 causes its normally closed contacts in line 151 to open, de-energizing relay AE (line 151) at time T–25. The de-energization of relay AE (line 151) at this time causes its contacts in FIG. 6b to open, disconnecting the output of follow-up amplifier A'D1 from the input of integrating and memory circuits unit Img and discontinuing the integration performed by capacitor Ci1 thereof. Thus, at the end of the second revolution of the tire in its first direction of rotation, the integration cycle for that direction of rotation is completed.

The aforementioned energization of relay III at time T–24 causes its normally closed contacts III in lines 116, 122 and 141 to open and causes its normally open contacts III in lines 123 and 148 to close. The opening of contacts III in line 116 and the closing of contacts III in line 123 are without further effect. The closing of contacts III in line 148 upon energization of relay III (line 148) at time T–24 provides an alternate source of energization for relay III.

The opening of contacts III in line 141 upon energization of relay III at time T–24 causes relay E (line 141) to become de-energized at time T–25. Accordingly, contacts E (line 140) open, without further effect, and contacts E (line 145) open, concurrently de-energizing relay I (line 145) and relay A1 (line 146) at time T–26. Thus, contacts A1 (line 151) open, without further effect; contacts I (line 144) open, without further effect; and contacts I (line 143) open, de-energizing relay II (line 143) at time T–27. The contacts II in each of lines 142 and 147 then open, without further effect.

The aforementioned opening of contacts III in line 122 upon energization of relay III (line 148) at time T–24 causes concurrent de-energization of relay LG (line 121) and relay G (line 122) at time T–25. The de-energization of relay LG (line 121) at this time causes its single set of contacts in FIG. 6b to open, without further effect. The de-energization of relay G (line 122) at time T–25 causes a number of follow-up actions to occur, which actions will be considered in the paragraphs following the next paragraph.

Recalling that the drive motor M (line 103) is still rotating the test tire through its third revolution in the first direction, it will be realized that photoelectrically operated relay CE (line 126) becomes de-energized at time T–26. Accordingly, contacts CE in line 143 close and contacts CE in line 145 open. The closing of contacts CE in line 143 is without further effect. However, the opening of contacts CE in line 145 causes relay A3 (line 147) and relay III (line 148) to become concurrently de-energized at time T–27. The de-energization of relay A3 (line 147) at time T–27 causes its contacts in line 151 to close, without further effect. The de-energization of relay III (line 148) at time T–27 causes its normally closed contacts in lines 116, 122 and 141 to close, without further effect, and causes its normally open contacts in lines 123 and 148 to open, without further effect (the closing of contacts III in line 122 being without further effect due to the intervening sequential activities initiated upon de-energization of relay G in line 122 at time T–25, as described in greater detail in the following paragraphs).

Resuming now with a consideration of the activities occurring upon de-energization of relay G (line 122) at time T–25, it will be seen that when this happens the contacts G in lines 102, 103, 104 and 117 open, while the contacts G in line 123 close. The opening of contacts G in lines 102, 103 and 104 causes de-energization of the motor M (line 103) at time T-26, stopping the rotation of the test tire in its first direction. The opening of contacts G in line 117 causes relay TD (line 117) to deenergize at time T-26 and its contacts TD in line 150 open (without any time-delay), de-energizing relay DE (line 150) at time T-27. Accordingly, contacts DE in lines 141 and 150 and contacts DE in FIG. 6a open, without further effect. Also, the closing of contacts G in line 123 causes relay LD (line 124) and relay D (line 123) to concurrently become energized at time T-26.

The energization of relay LD (line 124) at time T-26 causes its single set of contacts in FIG. 6b to close. This preconditions the circuitry of FIG. 6b which interconnects the output of follow-up amplifier A'D1 with the input of integrating and memory circuits unit Imd to prepare for subsequent charging of the integrating capacitor Ci2 when the contacts AE in FIG. 6b later close.

The aforementioned energization of relay D (line 123) at time T-26 causes its contacts D in line 139 to close, energizing relay INV at time T-27 (line 139). Accordingly, the contacts of relay INV in FIG. 6a shift from the position shown in FIG. 6a to a position to the right of that shown. This causes the interconnections between the outputs of demodulator DEM and the inputs of differential amplifier AD1 of FIGURE 6a to be reversed, preconditioning these circuits for subsequent rotation of the test tire in the opposite direction.

The energization of relay D (line 123) at time T-26 also causes its contacts D in line 116 to close, energizing time-delay relay TD (line 117) at time T-27. This starts the time-delay period of its contacts TD in line 150 to run and, after a brief period of time-delay, the contacts TD in line 150 close, without further effect at this time.

In addition to the foregoing the energization of relay D (line 123) at time T-26 causes its normally open contacts D in line 144 to close, without further effect, and causes its normally closed contacts D in line 122 to open, without further effect. Also, its normally open contacts D in line 124 close, providing an alternate source of energization for relay D (line 123) and LD (line 124) which by-passes contacts III in line 123.

The final action resulting from the energization of relay D (line 123) at time T-26 is the closing of the contacts D in each of lines 105, 106 and 107. When this occurs, the drive motor M (line 103) is energized via conductors L11, L12, and L13 with an AC voltage whose phase is reversed relative to the phase of the AC voltage supplied to motor M during rotation of the test tire 10 in its first direction. Accordingly the motor M (line 103) and the test tire 10 rotate in a direction opposite to their direction of rotation when motor M was previously energized by contacts G in lines 102, 103 and 104. Thus, at time T-27 the test tire begins to rotate in its reverse or second direction.

Shortly after the reverse rotation begins, the photoelectrically operated relay CE (line 126) energizes, at time T-30, signifying the start of the first revolution of the test tire in its second direction of rotation. Accordingly, contacts CE in line 143 open and contacts CE in line 145 close. The opening of contacts CE (line 143) is without further effect. However, the closing of contacts CE in line 145 causes energization of relay DE (line 150) at time T-31 through a circuit comprising contacts CE (line 145) diode di3 (line 149) and the now closed time-delay contacts TD (line 150). Upon energization of relay DE (line 150) at time T-31, its contacts DE in line 141 and its single set of contacts DE in FIG. 6a close, without further effect. Also, its contacts DE in line 150 close, providing an alternate source of energization for relay DE (line 150) that by-passes the contacts CE in line 145 and the diode di3 (line 149).

At the end of the first half revolution of the test tire in its second direction of rotation, relay CE (line 126) becomes deenergized, at time T-33. Accordingly, its contacts CE in line 143 close and its contacts CE in line 145 open. The opening of contacts CE in line 145 is without further effect. The closing of contacts CE in line 143 causes relay E (line 141) to become energized, at time T-34, through a circuit comprising contacts CE (line 143), diode di4 (line 141), the now-closed contacts DE (line 141) and the contacts III (line 141). Upon energization of relay E (line 141) at time T-34, its contacts E in line 140 close, providing an alternate source of energization for relay E, and its contacts E in line 145 close, without further effect.

With continued rotation of the test tire in the reverse direction, the photoelectrically operated relay CE (line 126) becomes energized at time T-36, signifying the start of the second revolution of the tire in its reverse direction. Accordingly, contacts CE in line 143 open, without further effect, and contacts CE in line 145 close, causing concurrent energization of relay I (line 145) and relay A1 (line 146) at time T-37. The energization of relay I (line 145) at time T-37 causes its contacts I in line 143 to close, without further effect, and causes its contacts I in line 144 to close, providing an alternate source of energization for relay I (line 145) and relay A1 (line 146).

The aforementioned energization of relay A1 (line 146) at time T-37 causes its contacts A1 in line 151 to close, energizing relay AE (line 151) at time T-38. As a result of this, contacts AE in FIG. 6b close, interconnecting the output of amplifier A'D1 with the input of integrating and memory circuits unit Imd, to begin charging the integrating capacitor Ci2 thereof. This charging continues during the entire second revolution of the test tire in its second direction of rotation.

At the end of one and a half revolutions of the test tire in its second direction of rotation, the photoelectrically operated relay CE (line 126) becomes deenergized at time T-39, causing its contacts CE in line 145 to open, without further effect, and causing its contacts CE in line 143 to close. The closing of contacts CE in line 143 causes relay II (line 143) and relay IIA (line 144) to become energized at time T-40. The energization of relay II (line 143) at time T-40 causes its contacts II in line 142 to close, providing an alternate source of energization for relays II and IIA, and causes its contacts II in line 147 to close, without further effect. The energization of relay IIA (line 144) at time T-40 causes its contacts IIA in line 115 to open, without further effect at this time.

The continued rotation of the test tire causes the photoelectrically operated relay CE (line 126) to become energized at time T-42, upon completion of the second revolution of the tire in its second direction of rotation. Accordingly, contacts CE in line 143 open, without further effect, and contacts CE in line 145 close. The closing of contacts CE in line 145 causes concurrent energization of relay A3 (line 147) and relay III (line 148) at time T-43.

The energization of relay A3 (line 147) at time T-43 causes its contacts A3 in line 151 to open, deenergizing relay AE (line 151) at time T-44. With the deenergization of relay AE (line 151) at time T-44, its contacts AE in FIG. 6b open, disconnecting the output of follow-up amplifier A'D1 from the input of integrating and memory circuits unit Imd. Accordingly, integrating capacitor Ci2 stops charging at time T-44.

The aforementioned energization of relay III (line 148) at time T-43 causes its normally open contacts III in each of lines 123 and 148 to close, without further effect, and causes its normally closed contacts III in each of lines 122 and 141 to open, without further effect. In addition its normally closed contacts III in line 116 open to deenergize control relay CR1 (line 115) at time T-44.

Upon deenergization of control relay CR1 (line 115) at time T-44, its contacts CR1 in line 135 open, de-energizing each of the following relays at time T-45 without further effect: relay DE (line 150); relay A3 (line 147); relay III (line 148); relay E (line 141); relay I (line 145); relay A1 (line 146); relay II (line 143); and relay IIA (line 144).

The deenergization of control relay CR1 (line 115), at time T-44 also causes its contacts CR1 in line 114 to open, deenergizing the solenoids of solenoid valves EV1 (line 112) and EV3 (line 114) at time T-45. Accordingly, at this time the test tire begins to deflate and the piston rod 4 begins to retract into power cylinder V, as may be seen by reference to the pneumatic control circuits of FIG. 4. As the air pressure in the test tire decreases, manometer switch MA (line 113) closes, at time T-47, without further effect. Similarly, the initial movement of piston rod 4 into power cylinder V causes limit switch contacts FDC1 (line 121) to open at time T-46, concurrently deenergizing relay D (line 123) and relay LD (line 124) at time T-47. The de-energization of relay LD (line 124) causes its contacts in FIG. 6b to open, without further effect. The deenergization of relay D (line 123) at time T-47 causes its contacts in line 139 to open, deenergizing relay INV (line 139) at time T-48 and causing its contacts INV in FIG. 6a to shift to the position shown in FIG. 6a, without further effect. The deenergization of relay D (line 123) at time T-47 also causes its contacts D in line 116 to open, deenergizing relay TD (line 117) at time T-48 and causing its contacts TD in line 150 to open, without further effect. The deenergization of relay D (line 123) at time T-47 also causes its contacts D in lines 105, 106 and 107 to open, deenergizing the drive motor M (line 103) at time T-48 and causing the test tire to stop rotating. In addition, the normally open contacts D in line 124 open and the normally closed contacts D in line 122 close, upon deenergization of relay D (line 123) at time T-47, each without further effect.

Returning to the deenergization of control relay CR1 (line 115) at time T-44, the final series of activities stemming from this action will now be considered, this series of activities involving the algebraic summation and display of the integrated signals stored in the charged integrating capacitors $Ci1$ and $Ci2$ of FIG. 6b. When control relay CR1 (line 115) deenergizes at time T-44, its quick-acting contacts CR1 in line 118 (the left hand set of contacts CR1 in line 118, as viewed in FIG. 7a) close, energizing relay L (line 118) at time T-45 through a circuit including switch contacts Co (line 115), the quick-acting (left hand) set of contacts CR1 in line 118 and a time-delay (right hand) set of contacts CR1 in line 118 which remains closed for a predetermined period of time after relay CR1 deenergizes. Accordingly, the two sets of contacts L in FIG. 6b close at time T-45, interconnecting the integrating capacitors $Ci1$ and $Ci2$ with the inputs of respective amplifiers comprising transistors T6, T7 and T8, on the one hand, and transistors T'6, T'7 and T'8, on the other hand, the outputs of which amplifiers are interconnected with the inputs to differential amplifier AD2, as hereinbefore described. Differential amplifier AD2 algebraically sums the charges on integrating capacitors $Ci1$ and $Ci2$ and provides a visual display of the conicity force Fc (FIG. 1) by means of the voltmeter VC2 incorporated therein.

After a predetermined period of time elapses, at time T-49, during which period the operator will have been able to read the conicity force Fc directly from the voltmeter VC2, the time-delay (right hand) contacts CR1 in line 118 shift from their position in line 118 to their position in line 119, concurrently deenergizing relay L (line 118) and energizing relay RAZ (line 119) at time T-50. The deenergization of relay L (line 118) causes its contacts in FIG. 6b to open, disconnecting the integrating capacitors $Ci1$ and $Ci2$ from the circuitry leading to the differential amplifier AD2. The energization of relay RAZ (line 119) causes its two sets of contacts in FIG. 6b to close, providing a discharge path for each of integrating capacitors $Ci1$ and $Ci2$ through respective resistors RD1 and RD2 and resetting the integrating capacitors for subsequent testing of a new tire.

From the foregoing it will be seen that the automatic test cycle has been completed at this point. The test tire has previously been raised to its upper position and deflated to allow easy removal by the operator. When this has been done and a new test tire has been mounted on wheel J, the operator can initiate a new test cycle by manually pressing the push-button switch PC (line 115). This would occur at a time corresponding to time T-1 and the cycle would thereafter repeat itself.

In order to provide for manual control over the raising, lowering and inflation of the test tire and over the rotation of the tire switches Co (line 112), Im (line 112) and SR (line 119) are provided. When it is desired to go into manual operation, switch Co (line 112) is shifted from its "auto" position to its "man" position, causing contacts Co in line 113 to close, contacts Co in line 115 to open and contacts Co in line 121 to shift to their upper position. At this point, switch Im (line 112) may be shifted from its "auto" position to its "man" position. When this is done, contacts Im in line 113 close, causing the tire inflation solenoids EV2 (line 113) and EV3 (line 114) to become energized to inflate the tire and causing the tire lowering solenoid EV1 (line 112) to become energized to lower the tire. Similarly, switch SR (line 119) may be moved from its A position at which the tire is stopped, to either the G position or the D position, in which case the tire will start rotating in one or the other direction, depending on which way the switch is moved. When switch SR (line 119) is moved to its G position, its contacts complete a circuit through line 120 to energize relay G (line 122). Accordingly, contacts G in lines 102, 103 and 104 close to energize drive motor M (line 103) to drive the tire in its first direction of rotation. When switch SR (line 119) is moved to its D position, its contacts complete a circuit through line 121 to energize relay D (line 123). Accordingly, contacts D in lines 105, 106 and 107 close to energize drive motor M (line 103) to drive the tire in its second direction of rotation. When switch SR (line 119) is in its A, neither of its contacts in lines 120 and 121 are closed and therefore neither relay G (line 122) nor relay D (line 123) is energized. Accordingly, the drive motor does not rotate the tire with the switch SR (line 119) in its A position.

The foregoing concludes the detailed description of a particular embodiment of this invention. It will be obvious to those skilled in the art that various changes and modifications may be made in the invention without departing from the invention in its broader aspects. For example, any appropriate type of transducing device, such as a strain gauge, inductive pickup, etc., may be substituted for the differential transformer CA to convert the mechanical movement of the stress detecting means SDM into a corresponding electrical output. Also, any suitable arrangement of mechanical components which provides a mechanical output movement that corresponds to the transverse parasitic forces developed by a rolling tire may be substituted for the stress detecting means SDM.

Similarly, the invention is not limited to the specific integrating and display circuits and to the specific electrical control system set forth earlier herein, it being intended that any and all circuitry and controls which fall within the true spirit and scope of this invention shall be covered.

Having thus described the invention, what is claimed and desired to be protected by Letters Patent of the United States is as follows:

1. A method of measuring the magnitude of a laterally directed force generated by a rolling tire, comprising the steps of (1) rolling an inflated tire under predetermined load along a surface that is moveable in a direction substantially parallel to the axis of the tire in response to the urging of the laterally directed force generated by the rolling of the tire along the surface, (2) sensing the movement of said surface and developing two voltages whose difference corresponds to the amount and character of such movement during at least one revolution of the tire in one direction, and (3) displaying the difference voltage on a calibrated indicating device to provide a measurement of the magnitude of said force.

2. The method of claim 1, in which one of said two voltages increases in magnitude while the other of said two voltages decreases in magnitude in response to the movement of said surface in a first direction, and in which movement of said surface in a second direction causes said one voltage to decrease in magnitude while said other voltage increases in magnitude.

3. The method of claim 1, in which said difference voltage is the difference between the absolute magnitudes of the two developed voltages regardless of the polarities of said two developed voltages.

4. The method of claim 1, in which said movement of said surface is sensed by a differential transformer, said transformer comprising a moveable coil carried by said surface and a fixed coil fastened to a relatively stationary object.

5. A method of measuring the magnitude of a laterally directed force generated by a rolling tire, comprising the steps of (1) rolling an inflated tire under predetermined load along a surface that is movable in a direction substantially parallel to the axis of the tire in response to the urging of the laterally directed force generated by the rolling of the tire along the surface, (2) sensing the movement of said surface and developing voltages corresponding to the mean values of such movement during at least one revolution of the tire in one direction and at least one revolution of the tire in another direction, and (3) displaying the difference between said mean values with a calibrated indicating device to provide a measurement of the magnitude of said force.

6. A method of measuring the magnitude of a laterally directed force generated by a rolling tire, comprising the steps of (1) rolling an inflated tire under predetermined load along a surface that is movable in a direction substantially parallel to the axis of the tire in response to the urging of the laterally directed force generated by the rolling of the tire along the surface, (2) sensing the movement of said surface and developing first and second voltages corresponding to the amount and character of such movement during, respectively, a first period of at least one revolution of the tire in one direction and a second period of at least one revolution of the tire in another direction, (3) integrating said first and second voltages during said periods, (4) subtracting the integral of the second voltage from the integral of said first voltage; and (5) displaying the remainder voltage with an indicating device calibrated to display such remainder voltage as a force.

7. Apparatus for measuring the magnitude of laterally directed forces generated by a rolling tire, comprising: a frame; a cylindrical roller; means for rotatably supporting the roller on the frame in a manner allowing substantially axial movement of the roller; sensing means coupled to the supporting means for initiating two voltages whose difference corresponds to the axial movement of the roller; means for supporting a tire rotatably with its axis substantially parallel to the axis of the roller; means for relatively moving the tire supporting means to bring the tire into contact with the roller for loading the tire; reversible drive means for rotating the tire and roller in rolling contact in first and second directions; and means to convert the difference voltages initiated by the sensing means into measurements of said laterally directed forces.

8. The apparatus of claim 7, in which said difference voltage is the difference between the absolute magnitudes of said two initiated voltages regardless of the polarities of said two initiated voltages.

9. The apparatus of claim 7, in which said movement of said surface is sensed by a differential transformer, said transformer comprising a moveable coil carried by said surface and a fixed coil fastened to a relatively stationary object.

10. Apparatus as described in claim 7 wherein said voltage converting means includes an amplifier means interconnected with said sensing means, the output of said amplifier means corresponding to the instantaneous lateral force developed in the rotating tire.

11. Apparatus as described in claim 10 and further including switching means positioned between said sensing means and said amplifier means, said switching means being operative to reverse the interconnections between said sensing means and said amplifier means with each reversal of the direction of rotation of said tire.

12. Apparatus as described in claim 11 wherein said voltage converting means further includes a calibrated indicating device graduated in units of force, the output of said amplifier means being connected to said indicating device to provide instantaneous readings of the laterally directed force developed by the rotating tire.

13. Apparatus as described in claim 10 and further including first and second integrating and memory circuit units connected to receive a voltage, during rotation of said tire in one direction and in another direction, respectively, corresponding to the output of said amplifier means, said units serving to integrate said corresponding voltages during equal periods of at least one revolution of said tire and to store charges representative of the integrals of said corresponding voltages over said periods.

14. Apparatus as described in claim 13 and further including second amplifier means, and means connecting said second amplifier means to said integrating and memory circuit units upon completion of a predetermined number of revolutions of said tire in both directions of rotation, said second amplifier means serving to amplify the difference between the charges stored in said integrating and memory circuit units.

15. Apparatus as described in claim 14 and further including a calibrated indicating device graduated in units of force, the output of said second amplifier means being connected to said indicating device to provide readings of the conicity force developed by the rotating tire.

16. Apparatus for measuring the magnitude of laterally directed forces generated by a rolling tire, comprising: a frame; a cylindrical roller; means for rotatably supporting the roller on the frame in a manner allowing substantially axial movement of the roller; sensing means coupled to the supporting means for initiating voltages corresponding to the axial movement of the roller; means for supporting a tire rotatably with its axis substantially parallel to the axis of the roller; means for relatively moving the tire supporting means to bring the tire into contact with the roller for loading the tire; reversible drive means for rotating the tire and roller in rolling contact in first and second directions; voltage converting means including an amplifier means interconnected with said sensing means, the output of said amplifier means corresponding to the instantaneous lateral force developed in the rotating tire; and switching means positioned between said sensing means and said amplifier means, said switching means being operative to reverse the interconnections between said sensing means and said amplifier means with each reversal of the direction of rotation of said tire.

17. Apparatus for measuring the magnitude of laterally directed forces generated by a rolling tire, comprising: a frame; a cylindrical roller; means for rotatably supporting the roller on the frame in a manner allowing substantially axial movement of the roller; sensing means coupled to the supporting means for initiating voltages corresponding to the axial movement of the roller; means for supporting a tire rotatably with its axis substantially parallel to the axis of the roller; means for relatively moving the tire supporting means to bring the tire into contact with the roller for loading the tire; reversible drive means for rotating the tire and roller in rolling contact in first and second directions; voltage converting means including an amplifier means interconnected with said sensing means, the output of said amplifier means corresponding to the instantaneous lateral force developed in the rotating tire; first and second integrating and memory circuit units connected to receive a voltage, during rotation of said tire in one direction and in another direction, respectively, corresponding to the output of said amplifier means, said units serving to integrate said corresponding voltages during equal periods of at least one revolution of said tire and to store charges representative of the integrals of said corresponding voltages over said periods.

18. Apparatus as described in claim 17 and further including second amplifier means, and means connecting said second amplifier means to said integrating and memory circuit units upon completion of a predetermined number of revolutions of said tire in both directions of rotation, said second amplifier means serving to amplify the difference between the charges stored in said integrating and memory circuit units.

19. Apparatus as described in claim 18 and further including a calibrated indicating device graduated in units of force, the output of said second amplifier means being connected to said indicating device to provide readings of the conicity force developed by the rotating tire.

References Cited
UNITED STATES PATENTS

| | | | |
|---|---|---|---|
| 3,142,178 | 7/1964 | Gough et al. | 73—146 |
| 3,206,973 | 9/1965 | Obarski | 73—146 |
| 3,375,714 | 4/1968 | Bottasso | 73—146 |

DONALD O. WOODIEL, Primary Examiner

PO-1050
(5/69)

UNITED STATES PATENT OFFICE
CERTIFICATE OF CORRECTION

Patent No. 3,473,422          Dated October 21, 1969

Inventor(s) Jean Leblond

It is certified that error appears in the above-identified patent and that said Letters Patent are hereby corrected as shown below:

In Fig. 6a of the drawings the lead line connecting numeral C11 (upper occurrence) to a resistor should be deleted and replaced by a lead line connecting said numeral to the junction point to which the right end of resistor R3 is connected. Column 1, line 67, the word "tie" should read --tire--. Column 2, line 45, the word "prefererd" should read --preferred--. Column 3, line 70, the word "Example" should read --FIG.--. Column 5, line 18, the word "matter" should read --manner--. Column 7, line 65, the word "same" should read --opposite--; line 66, after "itself" insert --is--; line 69, the phrase "a given direction" should read --different directions--. Column 8, line 66, delete "put". Column 10, line 22, the numeral "6a" should read --6b--; line 75, the word "swich" should read --switch--. Column 11, line 1, the word "he" should read --the--; line 53, the word "a" should read --at--; line 56, the word "on" should read --in--; line 67, the word "do" should read --does--. Column 13, line 16, the word "circuits" should read --circuit--. Column 14, line 39, the word "enegization" should read --energization--. Column 17, line 40, the word "relay" should read --relays--. Column 18, lines 47 and 48, the word "energfized" should read --energized--. Column 22, line 12, the claim reference numeral "11" should read --10--.

SIGNED AND
SEALED
AUG 11 1970

(SEAL)
Attest:

Edward M. Fletcher, Jr.
Attesting Officer

WILLIAM E. SCHUYLER, JR.
Commissioner of Patents